(12) United States Patent
Vachon

(10) Patent No.: US 11,865,713 B2
(45) Date of Patent: Jan. 9, 2024

(54) CABLE ROBOT

(71) Applicant: 10087530 CANADA INC., Saint-Bruno-de-Montarville (CA)

(72) Inventor: Frédéric Vachon, Saint-Bruno-de-Montarville (CA)

(*) Notice: Subject to any disclaimer, the term of this patent is extended or adjusted under 35 U.S.C. 154(b) by 398 days.

(21) Appl. No.: 17/089,826

(22) Filed: Nov. 5, 2020

(65) Prior Publication Data
US 2021/0069897 A1  Mar. 11, 2021

Related U.S. Application Data

(63) Continuation of application No. PCT/CA2020/050457, filed on Apr. 7, 2020.

(60) Provisional application No. 62/931,979, filed on Nov. 7, 2019, provisional application No. 62/830,783, filed on Apr. 8, 2019.

(51) Int. Cl.
*B25J 9/10* (2006.01)
*B25J 11/00* (2006.01)

(52) U.S. Cl.
CPC ............. *B25J 9/1045* (2013.01); *B25J 11/00* (2013.01)

(58) Field of Classification Search
CPC . B25J 11/00; B25J 9/0018; B25J 9/104; B25J 9/1045
USPC ...................................... 414/222.01
See application file for complete search history.

(56) References Cited

U.S. PATENT DOCUMENTS

| 4,625,938 A | 12/1986 | Brown |
| 4,710,819 A | 12/1987 | Brown |
| 5,113,768 A | 5/1992 | Brown |
| 5,224,426 A | 7/1993 | Rodnunsky et al. |
| 5,313,854 A | 5/1994 | Akeel |
| 5,408,407 A | 4/1995 | Lefkowitz et al. |
| 5,440,476 A | 8/1995 | Lefkowitz et al. |
| 5,568,189 A | 10/1996 | Kneller |
| 5,585,707 A | 12/1996 | Thompson et al. |
| 6,566,834 B1 | 5/2003 | Albus et al. |
| 6,809,495 B2 | 10/2004 | Rodnunsky |
| 6,826,452 B1 | 11/2004 | Holland et al. |
| 7,088,071 B2 | 8/2006 | Rodnunsky |
| 7,151,848 B1 | 12/2006 | Watanabe et al. |
| 7,560,071 B2* | 7/2009 | Nichols ............ B01L 3/565 422/65 |
| 7,753,642 B2 | 7/2010 | Bosscher et al. |
| 8,199,197 B2 | 6/2012 | Bennett et al. |

(Continued)

FOREIGN PATENT DOCUMENTS

| CN | 108582034 A | 9/2018 |
| DE | 102008013729 A1 | 9/2009 |

(Continued)

OTHER PUBLICATIONS

Related U.S. Appl. No. 16/378,734 Office Action dated May 31, 2019.

(Continued)

*Primary Examiner* — Charles A Fox
*Assistant Examiner* — Gregory T Prather

(57) ABSTRACT

A suspension cable robot is provided, its stability can be improved by using at least three groups of three cables arranged in a parallelogram manner. The ability to remain stable when subjected to forces acting on the robot platform or end effector is thereby significantly increased. The cable robot can be moved by cables to different working locations.

7 Claims, 29 Drawing Sheets

(56) References Cited

U.S. PATENT DOCUMENTS

| | | | |
|---|---|---|---|
| 8,418,662 | B2 | 4/2013 | Kim et al. |
| 9,063,390 | B2 | 6/2015 | Wharton |
| 9,308,652 | B2 | 4/2016 | Pehlivan et al. |
| 9,337,949 | B2 | 5/2016 | Wharton |
| 9,477,141 | B2 | 10/2016 | Wharton |
| 10,369,693 | B1 * | 8/2019 | Levine .................. A01C 7/085 |
| 2002/0041794 | A1 | 4/2002 | Bostelman et al. |
| 2003/0079957 | A1 | 5/2003 | Otaguro et al. |
| 2004/0124803 | A1 | 7/2004 | Rodnunsky |
| 2007/0165786 | A1 * | 7/2007 | Grasser .................. H02G 11/02 378/194 |
| 2008/0051015 | A1 * | 2/2008 | Schneider ........... B24B 13/0031 451/178 |
| 2009/0066100 | A1 | 3/2009 | Bosscher et al. |
| 2009/0103909 | A1 | 4/2009 | Giegerich et al. |
| 2009/0207250 | A1 | 8/2009 | Bennett et al. |
| 2013/0164107 | A1 | 6/2013 | Pehlivan et al. |
| 2013/0321613 | A1 | 12/2013 | Hansen et al. |
| 2013/0345876 | A1 | 12/2013 | Rudakevych |
| 2014/0331808 | A1 * | 11/2014 | Reid ...................... B25J 9/0075 74/490.04 |
| 2014/0361077 | A1 * | 12/2014 | Davidson ............. G06Q 10/087 235/385 |
| 2015/0062328 | A1 | 3/2015 | Lauffer et al. |
| 2015/0375390 | A1 * | 12/2015 | Becroft ................ B25J 11/0075 901/41 |
| 2016/0023761 | A1 | 1/2016 | McNally |
| 2016/0337771 | A1 * | 11/2016 | Di Censo ................ H04S 7/301 |
| 2017/0027803 | A1 | 2/2017 | Agrawal et al. |
| 2017/0355077 | A1 * | 12/2017 | Miller ........................ B25J 5/04 |
| 2018/0111265 | A1 | 4/2018 | DelSpina |
| 2019/0098221 | A1 | 3/2019 | Troy et al. |

FOREIGN PATENT DOCUMENTS

| | | |
|---|---|---|
| EP | 0246922 A2 | 11/1987 |
| EP | 1967784 A2 | 9/2008 |
| EP | 3318369 A1 | 5/2018 |
| JP | 2003245879 A | 9/2003 |
| WO | 95/023053 A1 | 8/1995 |
| WO | 01/077571 A1 | 10/2001 |
| WO | 2005/013195 A2 | 2/2005 |
| WO | 2005/042385 A2 | 5/2005 |
| WO | 2014/057028 A1 | 4/2014 |
| WO | 2018/087101 A1 | 5/2018 |
| WO | 2020/198862 A1 | 10/2020 |

OTHER PUBLICATIONS

Alejandro Rodriguez-Barroso et al., Cable-Driven Parallel Robot with Reconfigurable End Effector Controlled with a Compliant Actuator, Sensors 2018, 18(9), 2765, Aug. 22, 2018.

Clément M. Gosselin et al., Kinematic Analysis of Planar Parallel Mechanisms Actuated with Cables, www.researchgate.net/publication/238255376, Sep. 22, 2014.

Edward Amatucci et al., Summary of Modeling and Simulation for NIST RoboCrane® Applications, Deneb International Simulation Conference and Technology Showcase, Detroit, MI, Sep. 29-Oct. 3, 1997.

Eric Barnett et al., Large-Scale 3D Printing With A Cable-Suspended Robot, 2015, https://www.researchgate.net/publication/277727862_Large-Scale_3D_Printing_With_A_Cable-Suspended_Robot.

Giovanni Boschetti et al., Cable Robot Performance Evaluation by Wrench Exertion Capability, Robotics 2018, 7(2), 15: Mar. 27, 2018.

Dinh-Son Vu, et al., On the Design of a Three-DOF Cable-Suspended Parallel Robot Based on a Parallelogram Arrangement of the Cables, Cable-Driven Parallel Robots pp. 319-330, Part of the Mechanisms and Machine Science book series (Mechan. Machine Science, vol. 53), published in Springer International Publishing AG 2018.

Jean-Pierre Merlet, Computing cross-sections of the workspace of cable-driven parallel robots with 6 sagging cables, Computational Kinematics pp. 182-189, May 2017.

Lorenzo Gagliardini et al., Optimal Design of Cable-Driven Parallel Robots for Large Industrial Structures, Proceedings IEEE International Conference on Robotics and Automation—May 2014.

Melissa Morris et al., Applications and Theoretical Issues of Cable-Driven Robots, 22nd Florida Conference, May 21-22, 2009.

Mohammad M. Arefa et al., Optimal Design of Dexterous Cable Driven Parallel Manipulators, International Journal of Robotics, vol. 1, No. 1 (2009) Dec. 2, 2009.

Philipp Tempel et al., Design and Programming for Cable-Driven Parallel Robots in the German Pavilion at the EXPO 2015; Machines 2015, 3(3), 223-241, Aug. 25, 2015.

Robert L. Williams II et al., Seven-DOF Cable-Suspended Robot With Independent Metrology, Engineering Conference, Salt Lake City, UT Sep. 28-Oct. 2, 2004.

Tej Dallej et al., Towards vision-based control of cable-driven parallel robots, IEEE/RSJ International Conference on Intelligent Robots and Systems, pp. 2855-2860, Apr. 26, 2012.

XueJun Jin et al., Geometric Parameter Calibration for a Cable-Driven Parallel Robot Based on a Single One-Dimensional Laser Distance Sensor Measurement and Experimental Modeling, Sensors 2018, 18(7), 2392; Jul. 23, 2018.

Andreas Pott et al, Book, Cable-Driven Parallel Robots: Theory and Application, Mar. 28, 2018.

Bin Zi et al., Book, Design, Analysis and Control of Cable-Suspended Parallel Robots and Its Applications, 1st ed., 2017 Edition.

Andreas Pott et al., Book, Cable-Driven Parallel Robots: Proceedings of the Second International Conference on Cable-Driven Parallel Robots, Aug. 18, 2014.

Internationalpatent application No. PCT/CA2020/050457 Supplementary International Search Report dated Jul. 14, 2021.

Hamed Jamshidifar, "Integrated Trajectory-Tracking and Vibration Control of Kinematically-Constrained Warehousing Cable Robots". Thesis for the degree of PhD in Mechanical and Mechatronics Engineering, May 4, 2018.

Hamed Jamshidifar et al., "Kinematically-Constrained Redundant Cable-Driven Parallel Robots: Modeling, Redundancy Analysis, and Stiffness Optimization". IEEE/ASME Transactions on Mechatronics, IEEE Service Center, Piscataway, NJ, US, vol. 22, Issue: 2, Apr. 2017. pp. 921-930.

International patent application No. PCT/CA2020/050457 search report dated Jul. 3, 2020.

International patent application No. PCT/CA2020/050457 search strategy dated Jul. 3, 2020.

International patent application No. PCT/CA2020/050457 written opinion dated Jul. 3, 2020.

Bryson et al., "Configuration Robustness Analysis of the Optimal Design of Cable-Driven Manipulators". Journal of Mechanisms and Robotics, May 2016 (May 2016), vol. 8(6).

Corresponding Indian patent application No. 202147049149 examination report dated Apr. 13, 2023.

\* cited by examiner

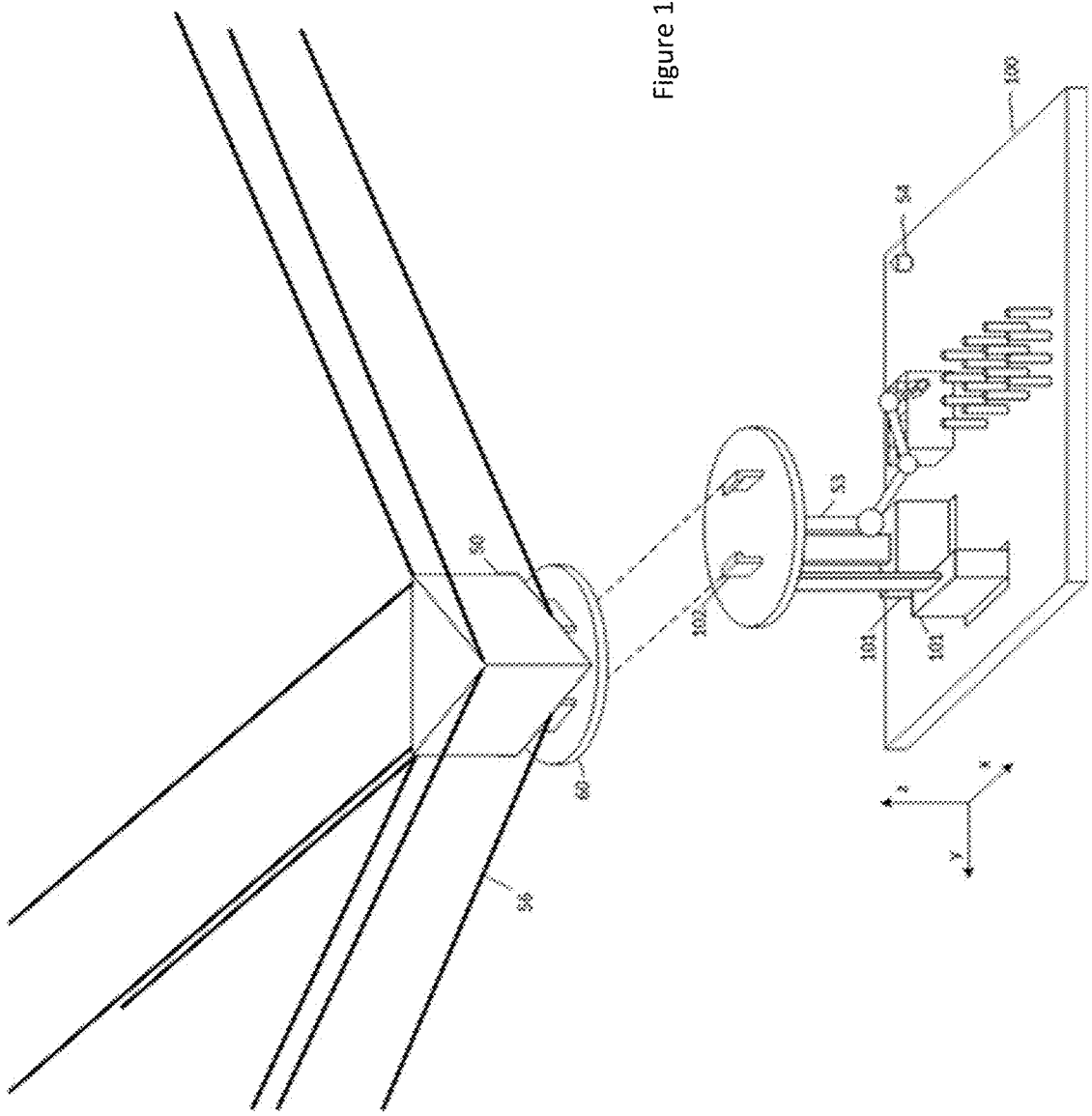

CABLE ROBOT

RELATED APPLICATIONS

The present patent application is a continuation application of International PCT application No. PCT/CA2020/050457 filed Apr. 7, 2020 designating the United States, that claims priority of U.S. provisional patent applications 62/830,783 filed Apr. 8, 2019 and 62/931,979 filed Nov. 7, 2019, the contents of which are hereby incorporated by reference. U.S. Pat. No. 10,471,590 issued on Nov. 12, 2019 claims priority to provisional patent application 62/830,783 filed Apr. 8, 2019.

FIELD OF THE INVENTION

The present patent application relates to the field of cable robots.

BACKGROUND

Ceiling-mounted robots are also known in the art, as for example from German patent publication 102008 013 729, published on 17 Sep. 2009. The objective is to allow the robotic arm to access and work within a large range while allowing mobility in the free space above objects within the work area.

Cable robots have been proposed in the academic and patent literature but are not in widespread use in industry. A cable robot is a robot or robotic platform that is held in space using cables so that the robot can be moved throughout a relatively large space or volume in comparison with articulated arm robots. To provide stability, most cable robot systems have cables that support the weight of the robotic platform from above as well as cables that stabilize the platform from below. An example is described in U.S. Pat. No. 7,753,642. While the stability can be satisfactory, the encumbrance of the lower stabilizing cables defeats the advantages of the mobility of a cable robot.

Cable robots that are suspended from cables only are also known in the paper titled "On the Design of a Three-DOF Cable-Suspended Parallel Robot Based on a Parallelogram Arrangement of the Cables" by Dinh-Son Vu, Eric Barnett, Anne-Marie Zaccarin, and Clement Gosselin and published in Springer International Publishing AG 2018 (C. Gosselin et al. (eds.), Cable-Driven Parallel Robots, Mechanisms and Machine Science 53), wherein a cable robot is described to use 3 pairs of cables configured as parallelograms to have the capability of moving in a 3D environment maintaining a constant orientation of the central module from a top view (z axis). The main motivation of the work is to reduce the number of actuators needed in a translational parallel cable-suspended robot while ensuring a large workspace. One of the applications of such a mechanism is large-scale 3D printing, which typically requires positioning an end-effector with a constant orientation. This concept does not provide practical stability for an end-effector that would apply torque to the robot.

In U.S. Pat. No. 6,809,495, a camera platform is suspended by four cables, with the platform being stabilized by gravity as it hangs from the platform.

For a robot, stability is important because the end effector of the robot can exert force as it performs its tasks. The prior art suspended cable robots are limited in their ability to stabilize the robot end effector without having cables pulling downward.

SUMMARY

Applicant has discovered that stability in a suspension cable robot can be improved by using at least three groups of three cables arranged in a parallelogram manner. The ability to remain stable when subjected to forces acting on the robot platform or end effector is thereby significantly increased.

Applicant has discovered that stability in a suspension cable robot can be improved by locating cable actuation and cable uptake within the robotic platform as the weight of these components improves the stability. Further advantages of locating cable actuation and cable uptake within the robotic platform are simplification of installation and centralization of components at the robotic platform.

A first broad aspect is a cable robot platform apparatus including: a platform member, at least three cable groups, each one of the cable groups being arranged on one side of the platform member and having at least three cable connection supports spaced apart to form vertices of a vertically-arranged polygon to provide a parallelogram support for the platform member about three axes, wherein in use each cable group can extend between the platform member and a wall or ceiling anchor to provide the platform with gravity stabilized resistance to motion from forces and torques acting on the platform suspended from the cable groups within a predetermined limit, and a drive associated with each of the cable groups operable to control a length of the cable groups between the platform member and the anchor, wherein the drive controls a common length for each cable within each one of the at least three cable groups.

In some embodiments, the cable robot further includes a motion controller connected to the drive associated with each of the cable groups and responsive to a position input.

In some embodiments, the drive includes a spool for each cable of the cable groups.

In some embodiments, the spool is located at the platform member, the cable groups being fixedly anchorable to wall or ceiling anchors.

In some embodiments, the cable robot further includes a tension measurement element associated with the cable groups for providing a tension signal representing tension in the cable groups.

In some embodiments, the cable robot further includes an alarm condition detector having as input the tension signal and as output a signal representing a risk of instability due to a loss of tension in at least one cable of the cable groups.

In some embodiments, the cable robot further includes a stretch calculator having as input the tension signal and a measurement of the length of the cable groups, and as output a signal representing an adjustment to the measurement of the length of the cable groups.

In some embodiments, the platform member comprises an active tooling attachment platform.

In some embodiments, the cable robot further includes position sensors operative for sensing a position in space of the platform member.

In some embodiments, the number of the cable groups is three and each cable group comprises three cables.

In some embodiments, the cable groups comprise toothed cables or belt.

In some embodiments, the cable robot further includes a vertical, ceiling mountable cable or support for supporting the weight of the platform when not in use so as to reduce stretching of the cables over time.

In some embodiments, the cable robot further includes a power cable connected to the platform, the power cable being arranged above the platform.

In some embodiments, the cable robot further includes the wall or ceiling anchor, wherein the wall or ceiling anchor comprises at least three cable group anchorage members attachable to a wall or a ceiling and having cable anchor locations spaced apart to correspond to the vertices of the vertically-arranged polygon.

In some embodiments, the platform member provides a housing for motor controller and robot arm control computer components for use with a robot arm attachable to the platform member.

In some embodiments, the cable robot further includes a motion controller connected to the drive associated with each of the cable groups and responsive to a position input an interface, the interface including a connection to the housing for receiving commands from the robot arm control computer.

Another broad aspect is a cable robot platform apparatus including: a platform member, at least one leg extending from the platform member for ground or table support purposes to provide stability to the platform member using the ground or table support, at least three cables extendable in use between the platform member and a wall or ceiling anchor, wherein the platform can be suspended using the cables, and a drive associated with each of the cables operable to control a length of the cables between the platform member and the anchor.

In some embodiments, the cable robot further includes at least one mounting socket for receiving a lower end of at least one the leg.

In some embodiments, the socket comprises a lock engaging the lower end.

In some embodiments, the platform member comprises a lower platform member connected to the at least one leg and an upper platform member connected to the cables, further including a release mechanism interconnecting the lower platform member to the upper platform member.

In some embodiments, the lower platform member provides a housing for motor controller and robot arm control computer components for use with a robot arm attachable to the platform member.

In some embodiments, the at least one leg comprises a power connection for the motor controller and robot arm control computer components for receiving power from the ground or table support.

Another broad aspect is a method of manufacturing a product including the steps of: providing a cable robot platform apparatus, attaching an end effector or tool to the apparatus; and performing object handling and/or processing using the end effector or tool to manufacture the product.

In some embodiments, there is provided a cable robot platform apparatus including a platform member, at least three cable groups, each one of the cable groups being arranged to provide a parallelogram support for the platform member about three axes, wherein in use each cable group can extend between the platform member and a wall or ceiling anchor to provide the platform with gravity stabilized resistance to motion from forces and torques acting on the platform suspended from the cable groups within a predetermined limit, and a drive associated with each of the cable groups operable to control a length of the cable groups between the platform member and the anchor. In some of these embodiments, the apparatus can further comprise a motion controller connected to the drive associated with each of the cable groups and responsive to a position input.

In some embodiments, there is provided a cable robot platform apparatus comprising a platform member, at least three wall or ceiling anchors each having at least three cable anchor locations spaced apart to form vertices of a vertically-arranged polygon, at least three cable groups, each one of the cable groups having at least three cables and being arranged on one side of the platform member and having at least three cable connection supports spaced apart to form vertices of the vertically-arranged polygon to provide a parallelogram support for the platform member about three axes, wherein in use each cable group can extend between the platform member and the wall or ceiling anchors to provide the platform with gravity stabilized resistance to motion from forces and torques acting on the platform suspended from the cable groups within a predetermined limit, and a drive associated with each of the cables.

The cable robot can be moved by cables to different working locations.

BRIEF DESCRIPTION OF THE DRAWINGS

FIG. 19 is an oblique view of a cable robot that includes a stabilizing arm that mates with a complementary base mounted to a floor or table with the ability to detach the cable platform from the robot.

DETAILED DESCRIPTION

Overall Functionality

Figure 1A:
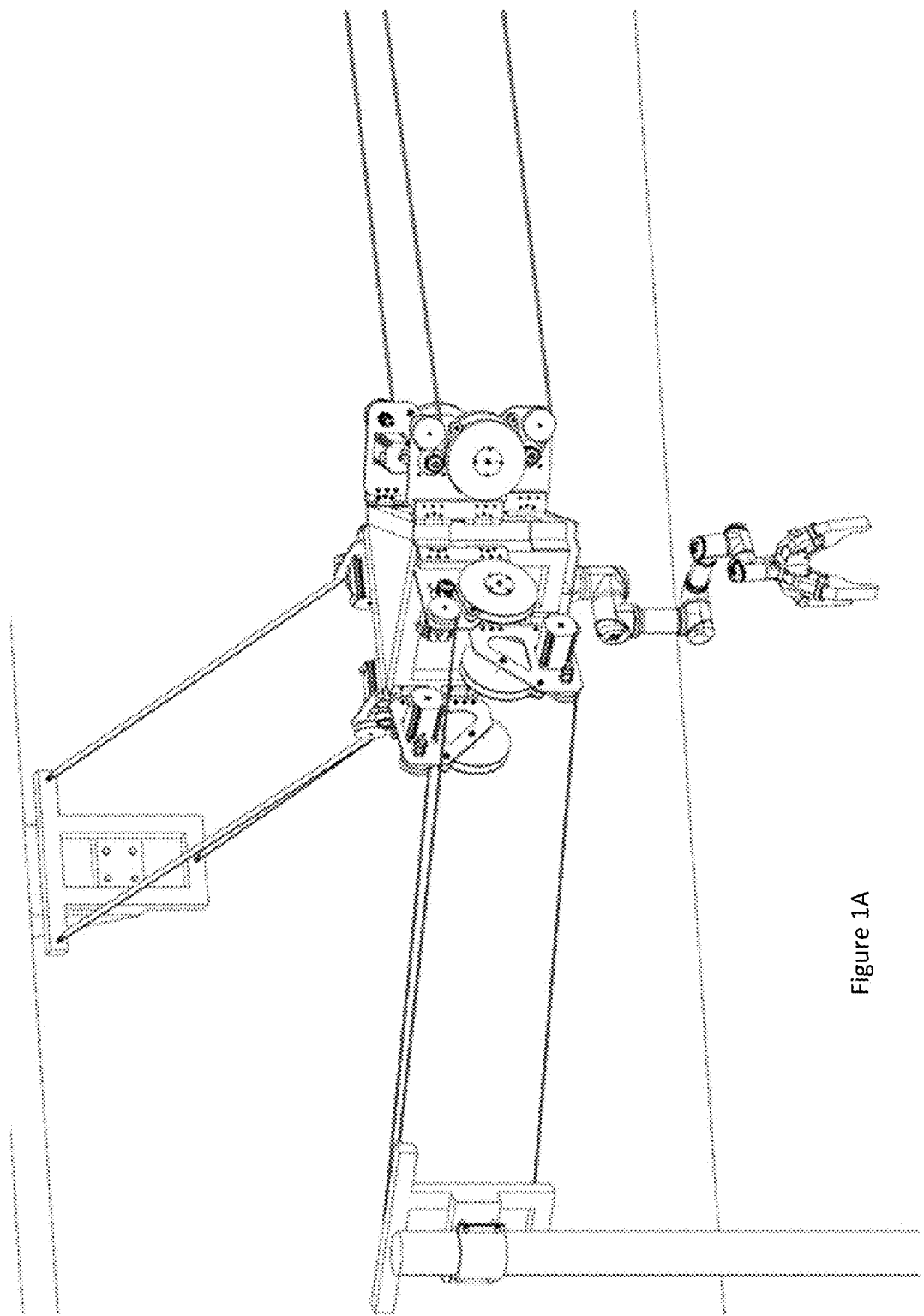
FIG. 1A is an oblique partial view of a suspended cable robot having 3 groups of 3 cables arranged in a parallelogram manner in which cable uptake spools and motors are arranged at the platform and a conventional robotic arm is mounted to the underside of the platform.
Figure 1B:
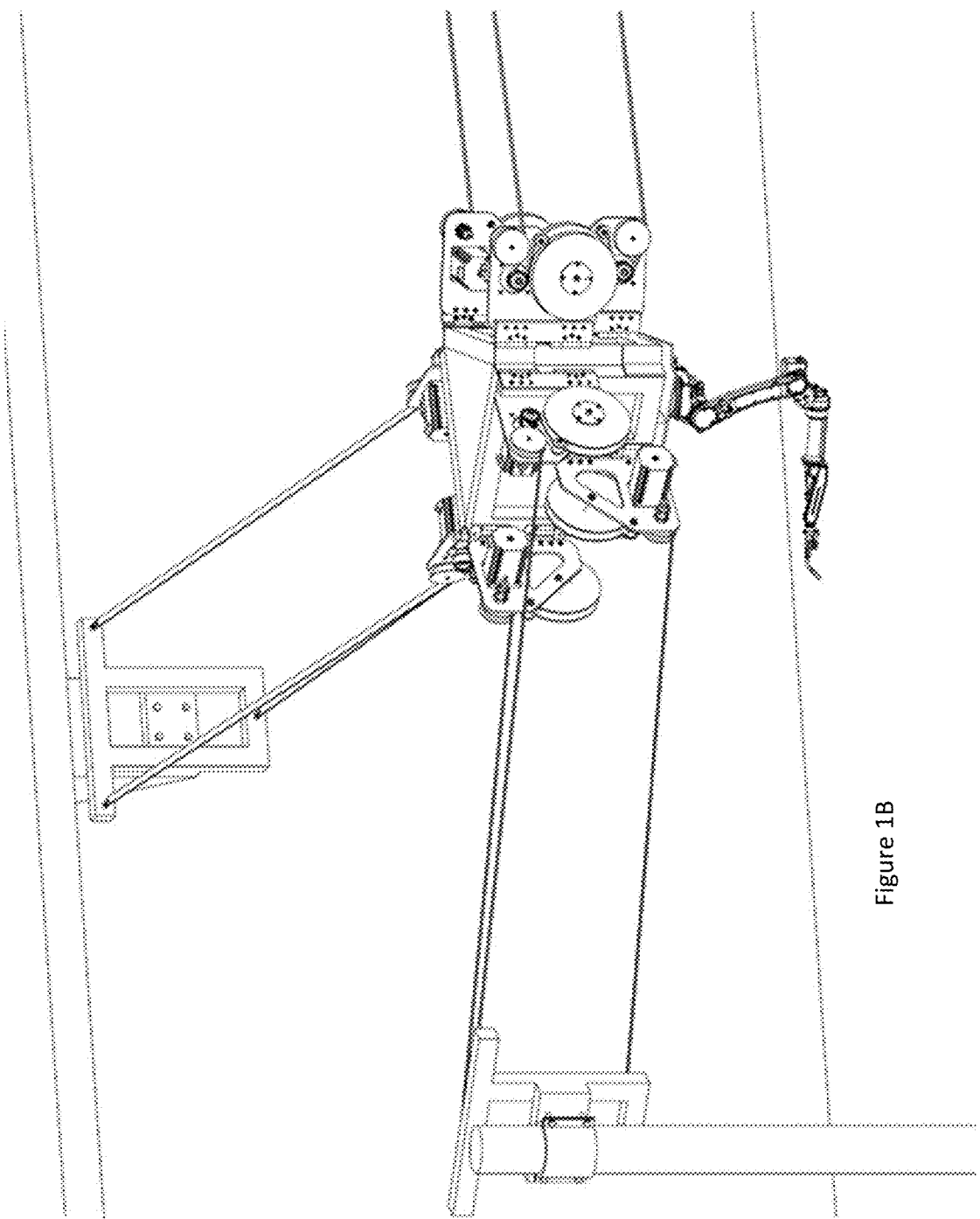
FIG. 1B is an oblique partial view of a suspended cable robot with a welding end-effector mounted upside-down.

A suspended robotic platform using cables can be used to operate precision displacement in 3 dimensions of specialized tools (53) over larger distances (see FIG. 1a and FIG. 1b). In the simplest form, three cables are provided in each group of a total of three groups. A cable group can have four cables, and it is possible to have 4, 5 or 6 cable groups if desired. Thus, the 9-12-15-16-18-20-24 cables can be disposed in 3-4-5-6 groups. 3-4 flexible cables can be placed in such a way that they form 3 or 4 parallelograms (80) per cable groups (51) from the central module (50) to the cable group anchorage (52). Tension in cables is induced by gravity, namely by the weight of the central module (50), so all cable groups (51) are oriented towards a higher anchorage point. These parallelograms (80) force the platform to always be parallel to a plane and to keep its orientation in the operational environment. Also, the parallelograms (80) provide enhanced stability to vibrations, payload variation, inertial redirections and externally induced forces. They oppose induced forces in relation with a ratio of the total weight of the central module, which varies according to the central module (50) position in the operational environment; in other words, each parallelograms (80) will provide the necessary force to the central module (50) in order for the module to remain at the desired position. To add precision, external sensors (54) and stabilization gyroscopes (85a and 85b) can be required depending on the final application. While using exact parallelograms is desirable, it will be understood that tolerance from an exact parallelogram can be acceptable as this can be compensated using appropriate cable actuation control.

To maximize the stabilisation effect of the weight of the central module and to facilitate the robotic platform integration in its environment, all active components may be included in central module (50). In some cases, active components can be installed on the supporting structure, with the same integrated principle, and thus the central module (50) would only include components related to the specialized tools (53).

Application

The robotic platform (FIG. 1a) in this configuration can be used in operational environments that requires a specialized tool (53) to work over larger than designed for distances, namely in areas in which a specialized tool may not reach certain parts and would need to be moved in order to perform all the desired operations. For example, when installed on the robotic platform, a robotic arm manipulator of small size will be able to cover large areas for handling objects.

Hereinafter is a list of exemplary areas of applications where the robotic platform is associated with a specialized tool that is specifically adapted and where automation is involved. The following are examples of where the combination of the robotic platform and the specialized tool can have a realistic purpose, but are not limited to:

Material handling (see FIG. 1a)
    Feeding multiple CNC machines with material
    Product assembly
    Component handling
    Warehouse handling
    Shipping handling
    Lab handling
Industrial manufacturing
    Welding (see FIG. 1b)
    Painting
    Polishing
    Sandblasting
    Laser cutting
Inspection:
    Camera
    X-Ray
    Laser distance acquisition
Inventory
    Datacenters
    Warehouse
Human transportation
Restaurant robotic service
3D Printing (large scale).
Cleaning determined area of operation
Building construction
Medical robotics The combination of the suspended robotic platform using cables and a specialised tool (57) can be part of a greater assembly for which all can be managed by a master controller (16) that supervises and controls overall activities of the full application.

Overall Design

Figure 2A:
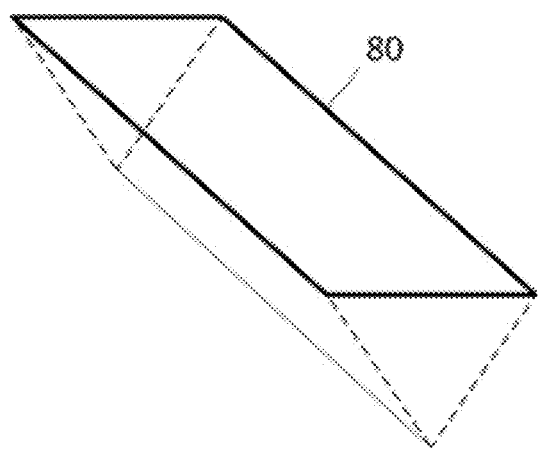
FIGS. 2A, 2B and 2C are schematic oblique views of a cable group of three cables highlighting the upper, left and right parallelograms.
Figure 2B:
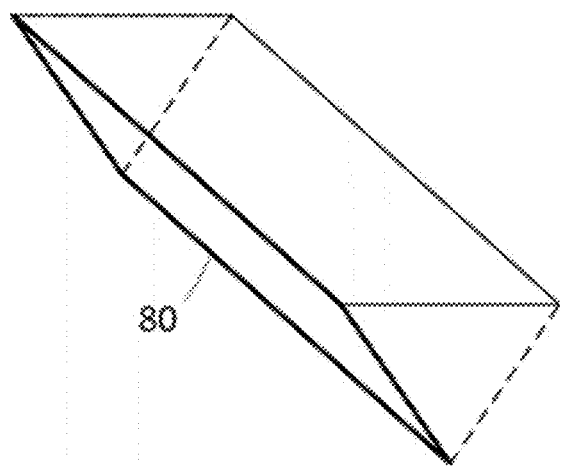
Figure 2C:
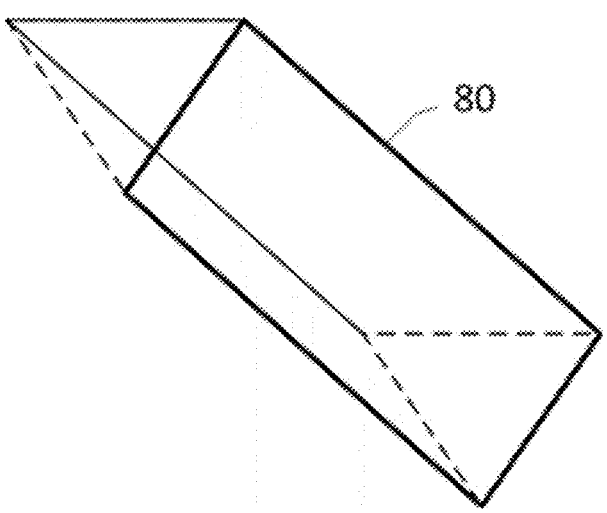

The robotic platform suspended by cables and stabilized by gravity (See FIG. 2a, FIG. 2b, FIG. 2c) can be constituted of 3 mains sections: the central module (50), 3 or more cable groups (51) and of a tooling attachment platform (60).

Cable groups (51) comprise cables (56), cable management units (57) and a cable group anchor or anchorage (52).

The minimal setup to suspend specialized tooling and move it in a 3D volume can use 3 cable groups of 3 cables each.

Figure 4A:
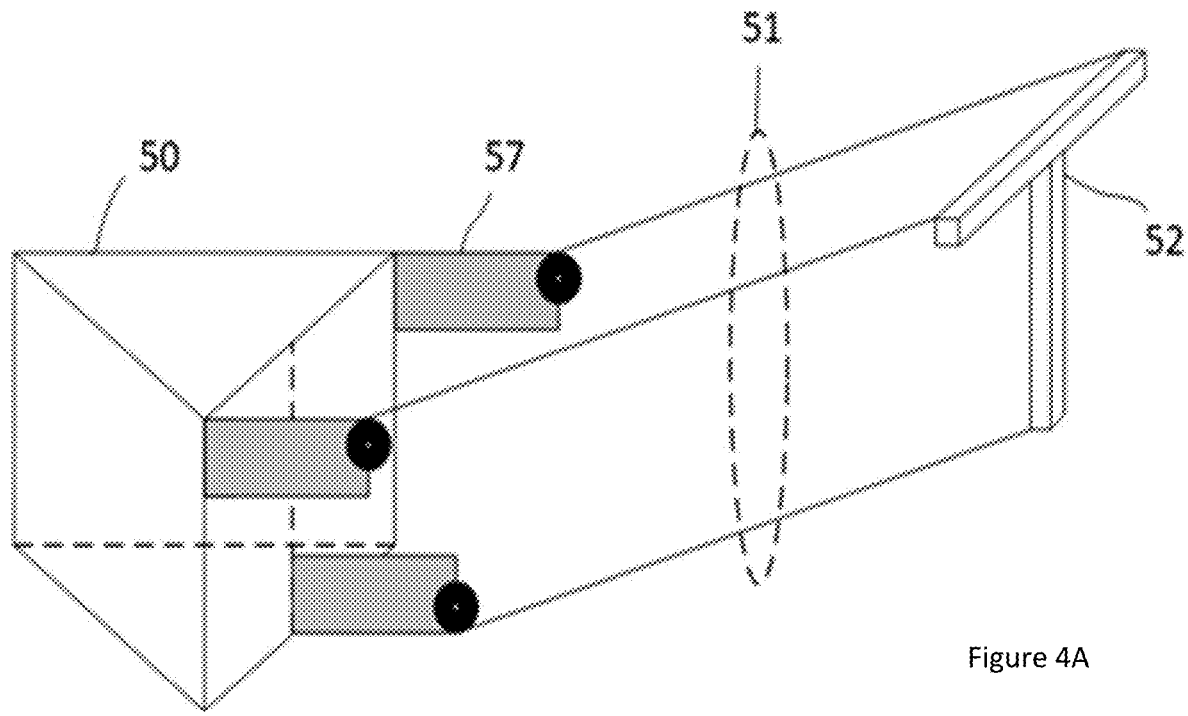
FIG. 4A is an oblique view of the cable group and its attachments, when cable management is centralized on the central module.
Figure 4B:
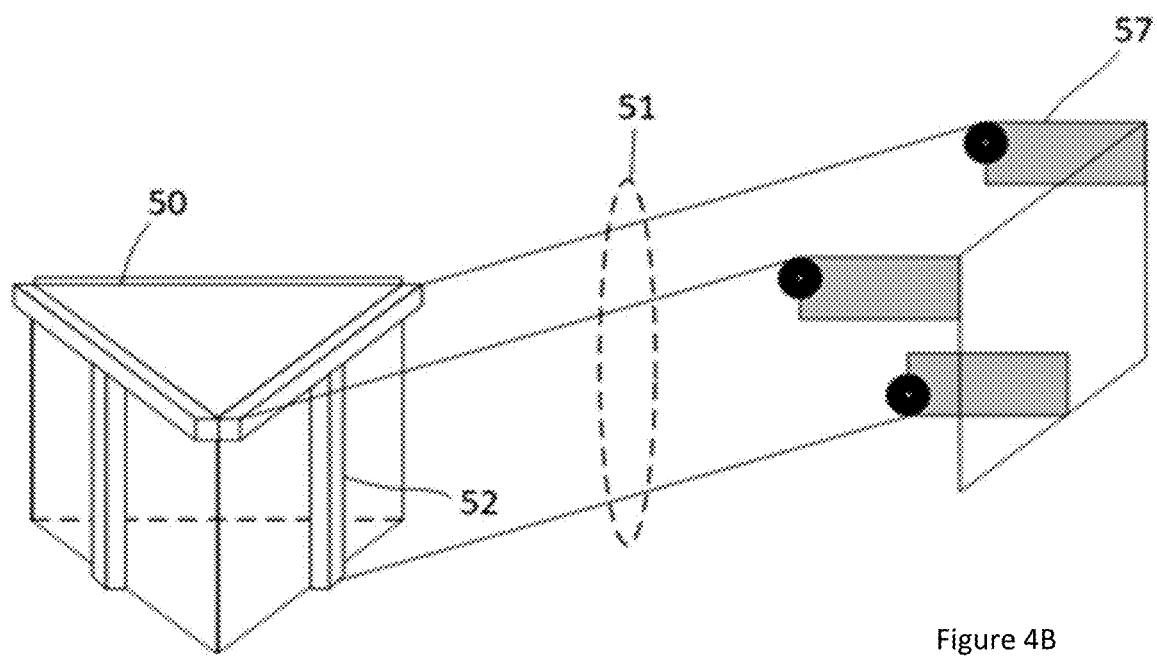
FIG. 4B is an oblique view of the cable group and its attachments, when cable management is distributed at the anchor points.

All the active systems can be centralized on the central module (50), as illustrated in FIG. 4a. However, it can be preferable to have the active components at the cable group anchor structure (66) as seen in FIG. 4b. When the robotic platform is required to have a constant orientation and a planar constant in a 3D environment, at least 3 cables (56) of the exact same length can be used in a cable groups (51) and can be installed in a configuration that produces parallelograms (80). To ensure optimal performance and to produce compensations that minimize elasticity effects in overall stability, each cable can be separately monitored in tension with a sensor and can be controlled by an independent cable traction unit (71).

Cable Group

A cable group (51) represents a predefined number of cables (56) (3 or 4) used together. Cables in cable groups are configured in parallelograms (80) that ensure the initial stability. Cables (56) are wound and un-wound mostly evenly in a way that parallelograms keep their characteristics while producing movement. One cable traction unit (71) per cable can be used to balance tension and to react to elasticity in the cable group while preserving the parallelogram geometry.

Figure 1C:
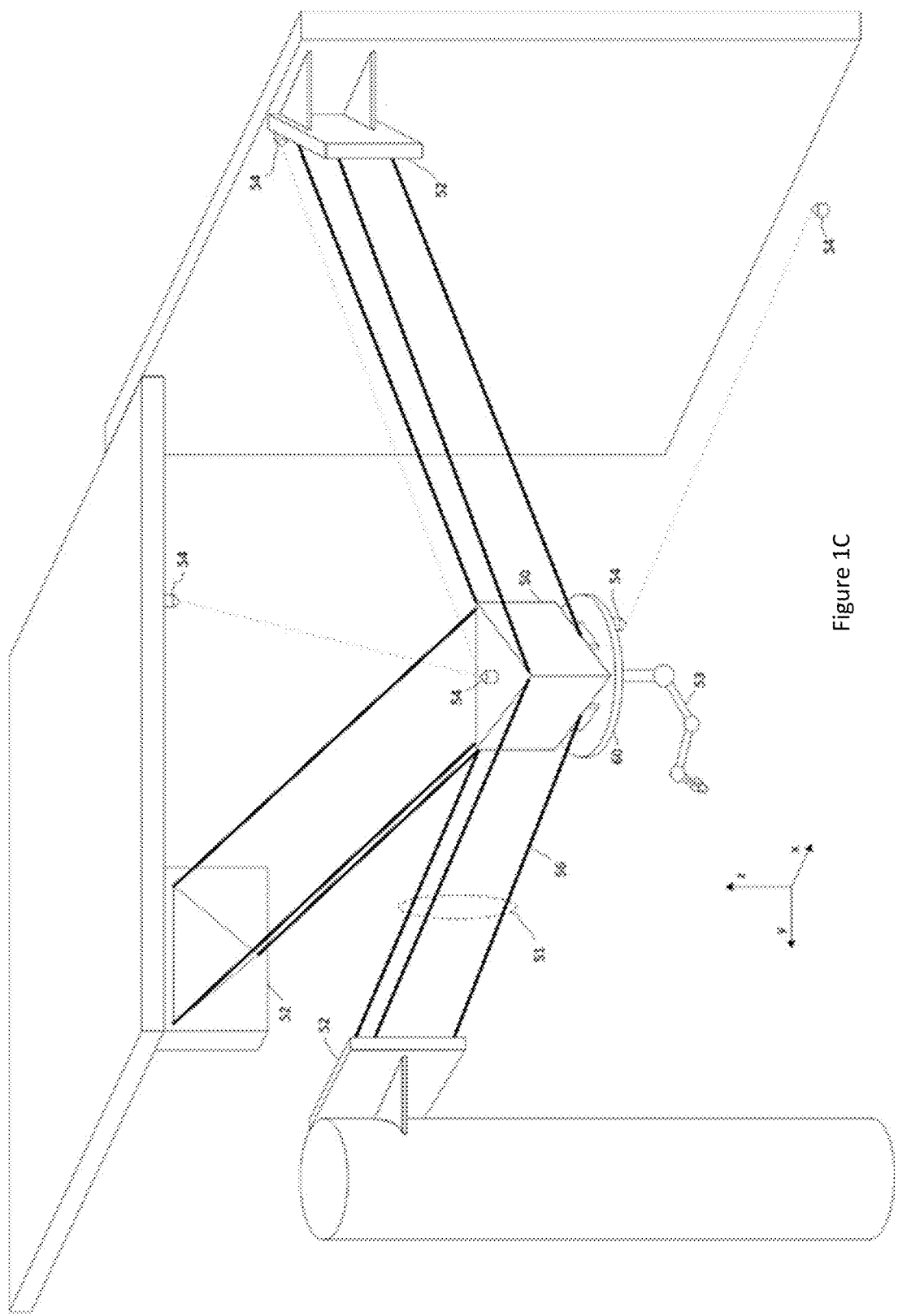
FIG. 1C is a schematic view of a cable robot embodiment similar to FIG. 1A to illustrate the cable geometry and platform location/positioning components with an adjustable attachment platform supporting the robotic arm.

FIG. 1c is an example of a 3 cable (56) per cable group (51) arrangement to produce parallelograms (80).

The cable groups (51) may comprise:

1—A given number of 3 or 4 cables (56),
  a. Cables may be made from metal ropes or wires, synthetic or natural fiber ropes, belts or chains. A toothed belt has been found to perform well.
2—One cable group anchorage (52)
3—The same number of cable management units (57) as cables (56). In some cases, one cable management units (57) can manage 2 or more cables (56) at the same time by using a single motor.

The cable groups (51) connect the central module (50) to the cable group anchor (52). When the cables comprise chains or are otherwise suitably flexible, the cable management can include a storage container instead of a spool, reel or cassette arrangement.

The attachment points (67) are sufficiently solid points, namely structurally sound fixture points that may support more than their required share of the central module (50) weight, in the operational environment that are used to install the cable group anchor (52). They are set or mounted higher than the central module (50) area or volume of operation.

The cables (56) included in the cable groups (51) can be arranged in any way to create parallelograms (80). In the case of 3 cables in a cable group, for which the attachment points would form a triangle, they can also be used in a non-equilateral attachment configuration without any pre-defined orientation. In the case of 4 points of attachment, the attachment points could have any quadrilateral configuration without any pre-defined orientation.

Central module (50) can support a separate tooling attachment platform (60) that supports the specialized tool or tools (53). The central module (50) can also include all active control components and power components of the robotic platform. It can also support all controls and power items related to the tooling and the tooling attachment platform (60) in active mode.

The central module (50) can be linked to the attachment points (67) through 3, 4, 5 or 6 cable groups (51). The cable groups (51) are attached on the sides of the central module (50) in a way to maximize stability according to the required specifications of the final application.

Figure 3A:
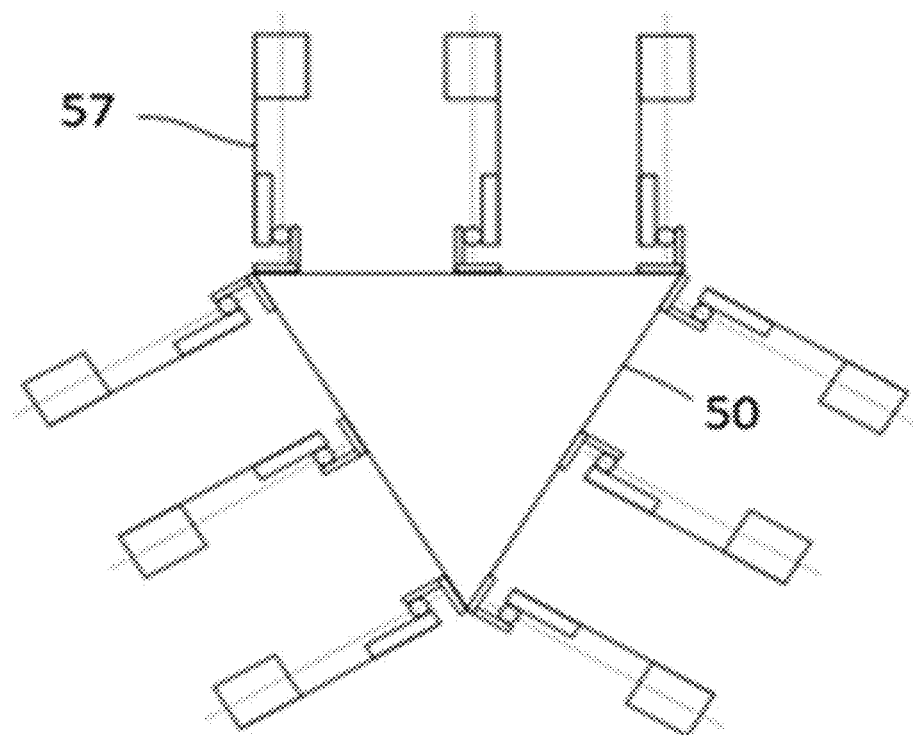
FIGS. 3A and 3B are a top and oblique view of a suspended cable robot having 3 groups of 3 cables arranged in a parallelogram (only one side shown).
Figure 3B:
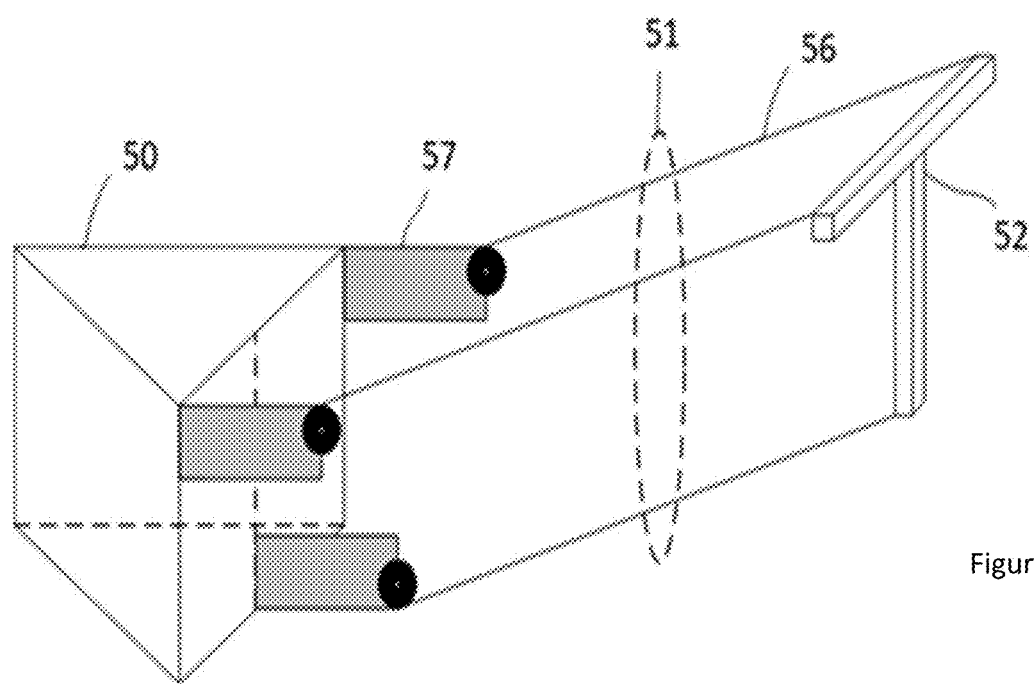
Figure 3C:
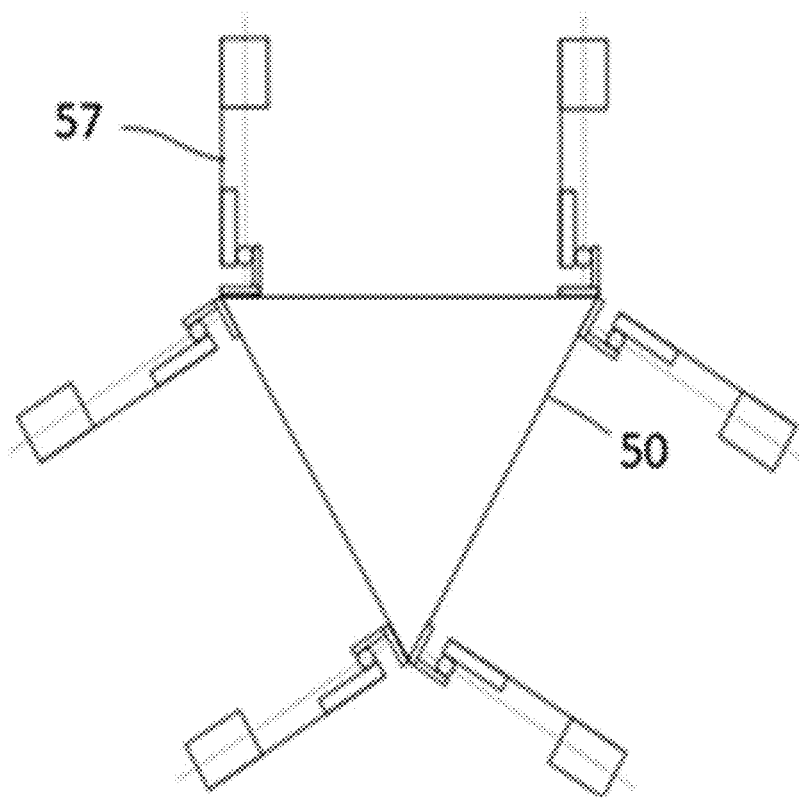
FIGS. 3C and 3D are a top and oblique view of a suspended cable robot having 3 groups of 4 cables arranged in a parallelogram (only one side shown).
Figure 3D:
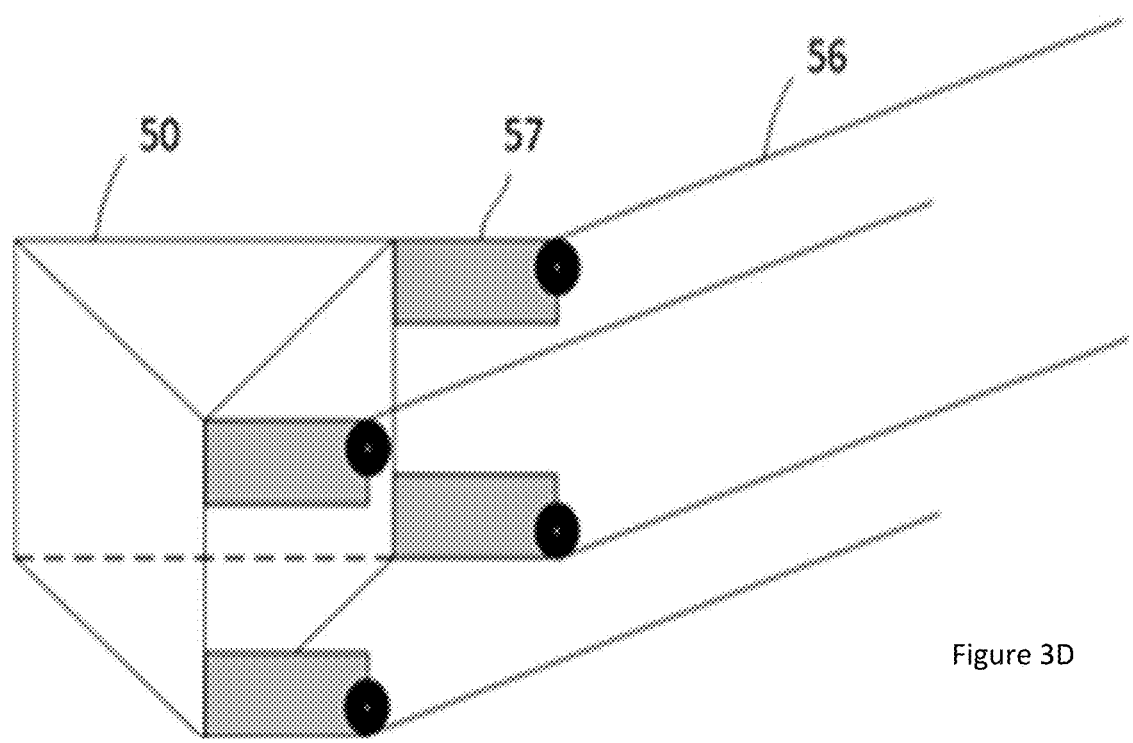
Figure 3E:
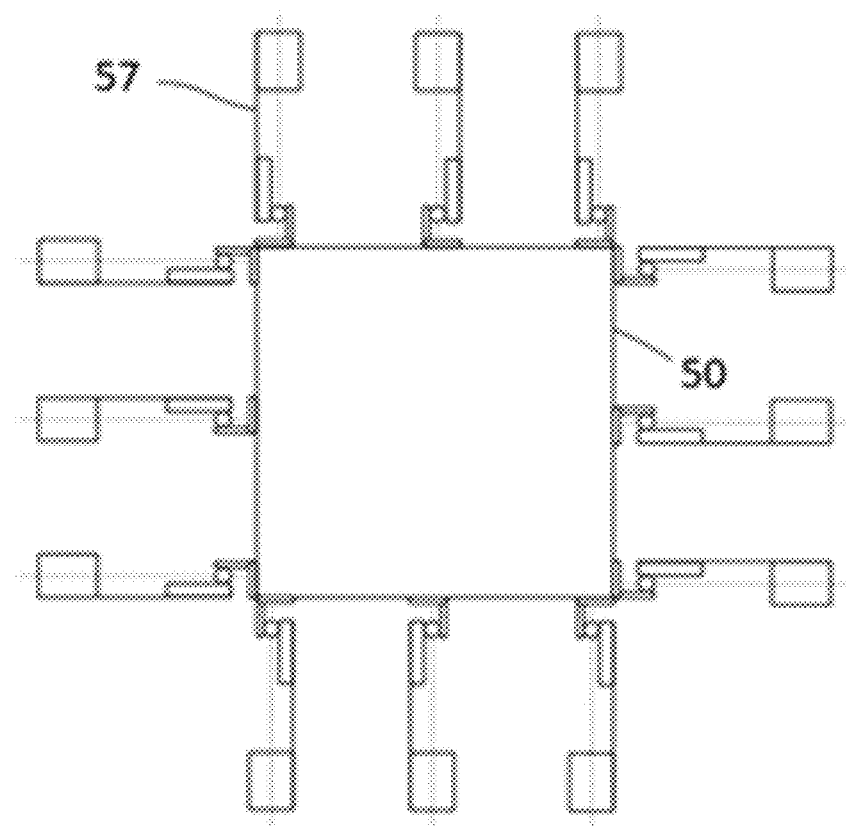
FIGS. 3E and 3F are a top and oblique view of a suspended cable robot having 4 groups of 3 cables arranged in a parallelogram (only one side shown).
Figure 3F:
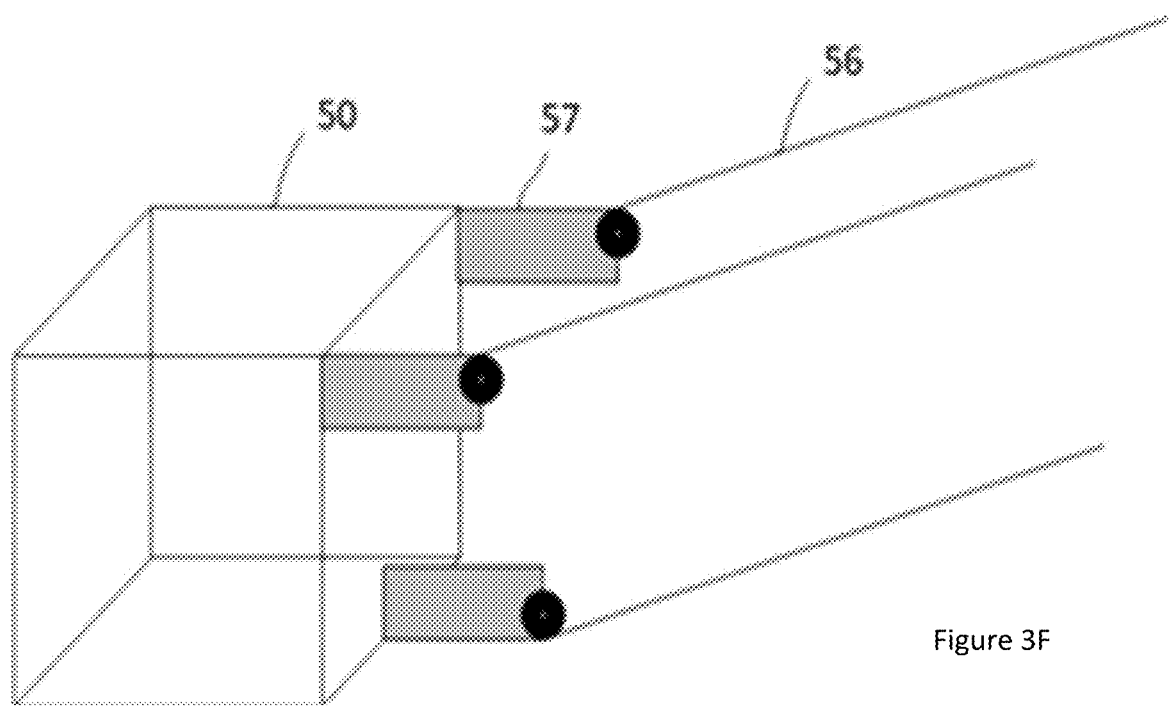
Figure 3G:
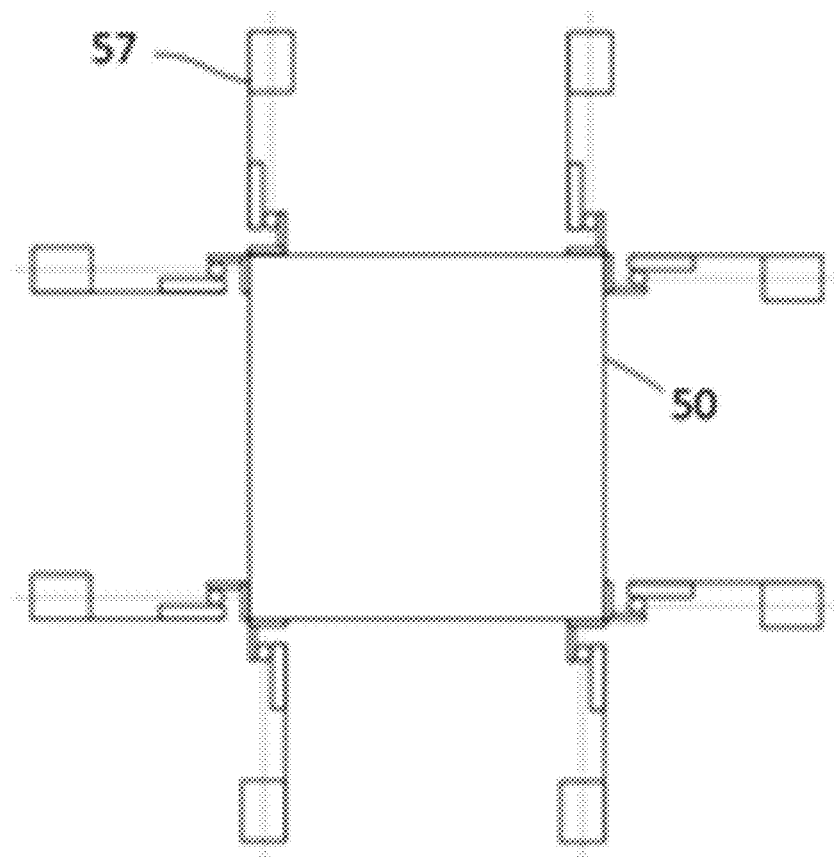
FIGS. 3G and 3H are a top and oblique view of a suspended cable robot having 4 groups of 4 cables arranged in a parallelogram (only one side shown).
Figure 3H:
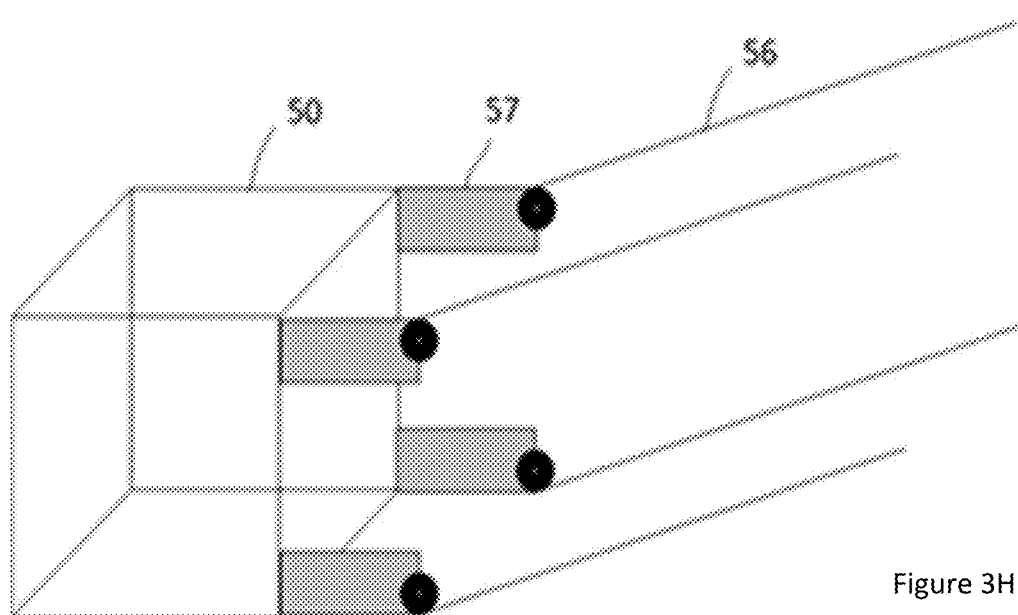
Figure 3I:
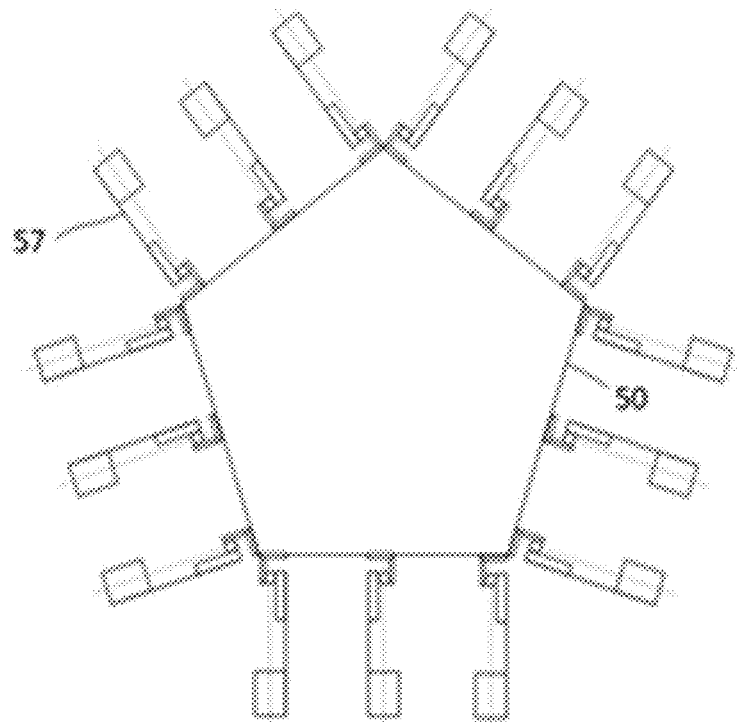
FIGS. 3I and 3J are a top and oblique view of a suspended cable robot having 5 groups of 3 cables arranged in a parallelogram (only one side shown).
Figure 3J:
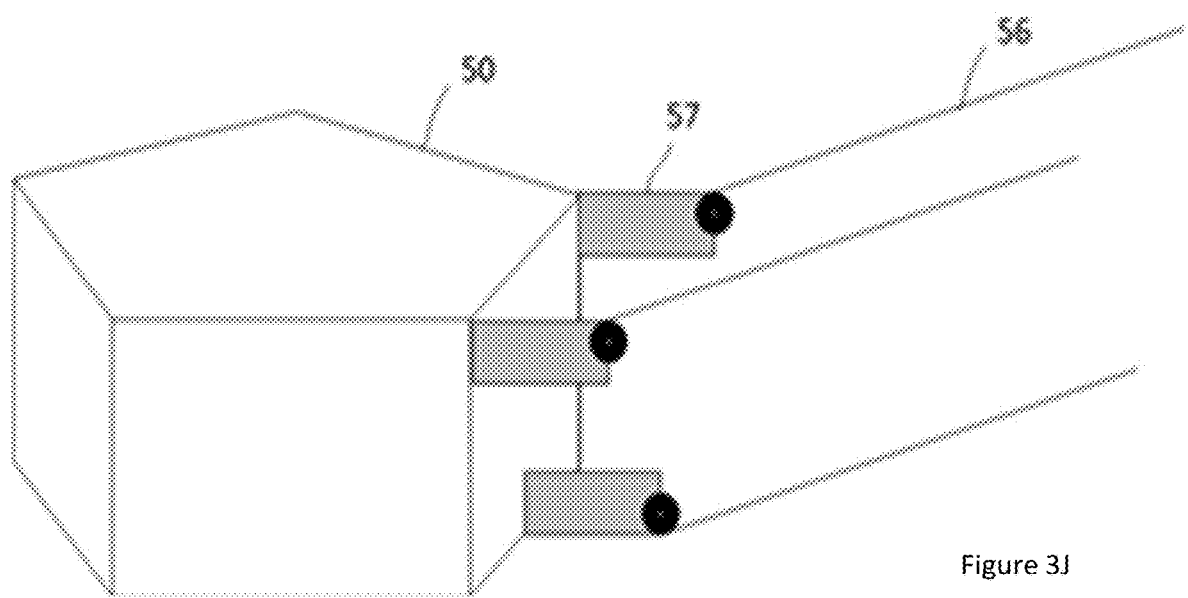
Figure 3K:
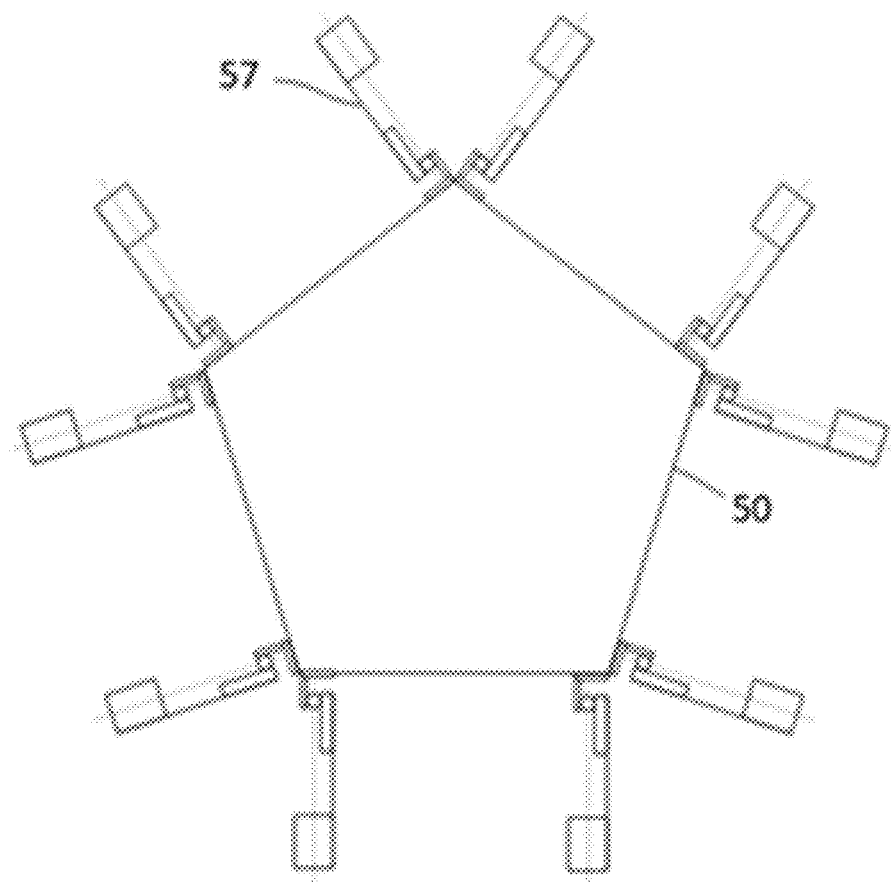
FIGS. 3K and 3L are a top and oblique view of a suspended cable robot having 5 groups of 4 cables arranged in a parallelogram (only one side shown).
Figure 3L:
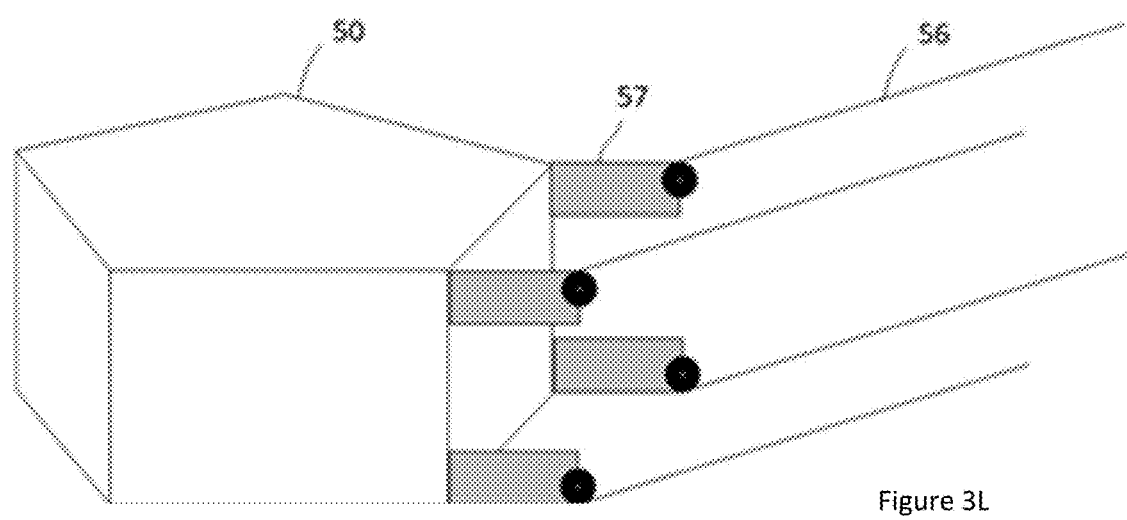
Figure 3M:
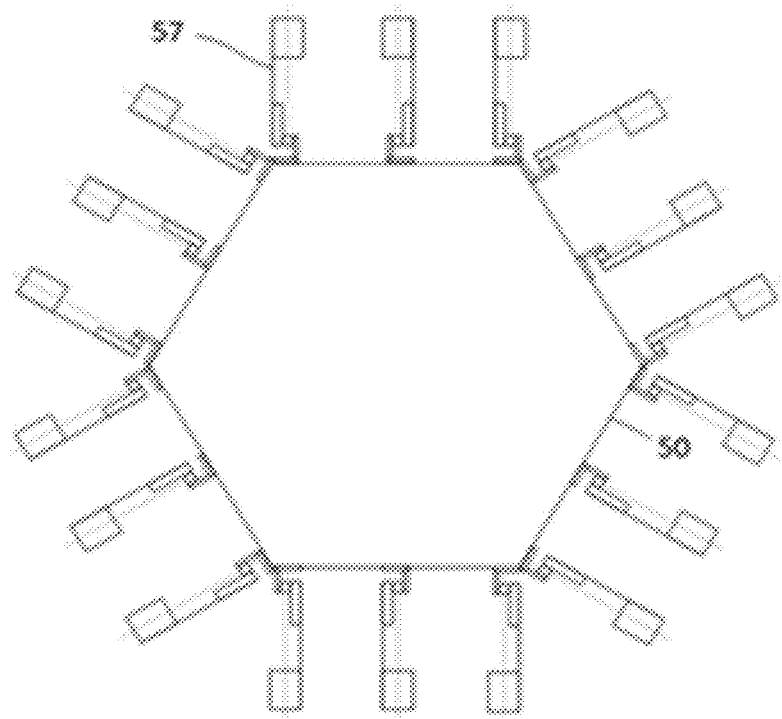
FIGS. 3M and 3N are a top and oblique view of a suspended cable robot having 6 groups of 3 cables arranged in a parallelogram (only one side shown).
Figure 3N:
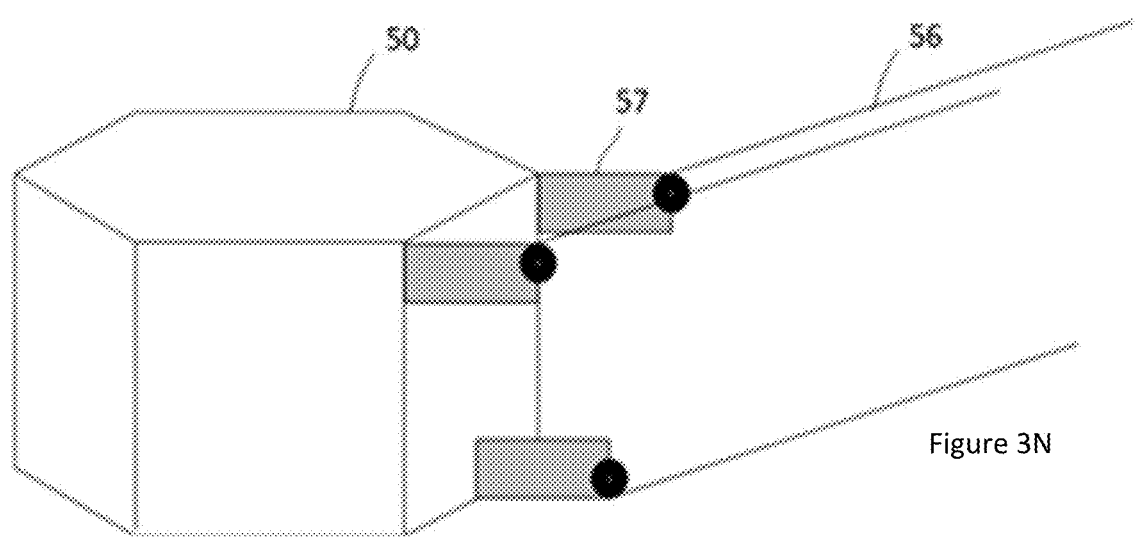
Figure 3O:
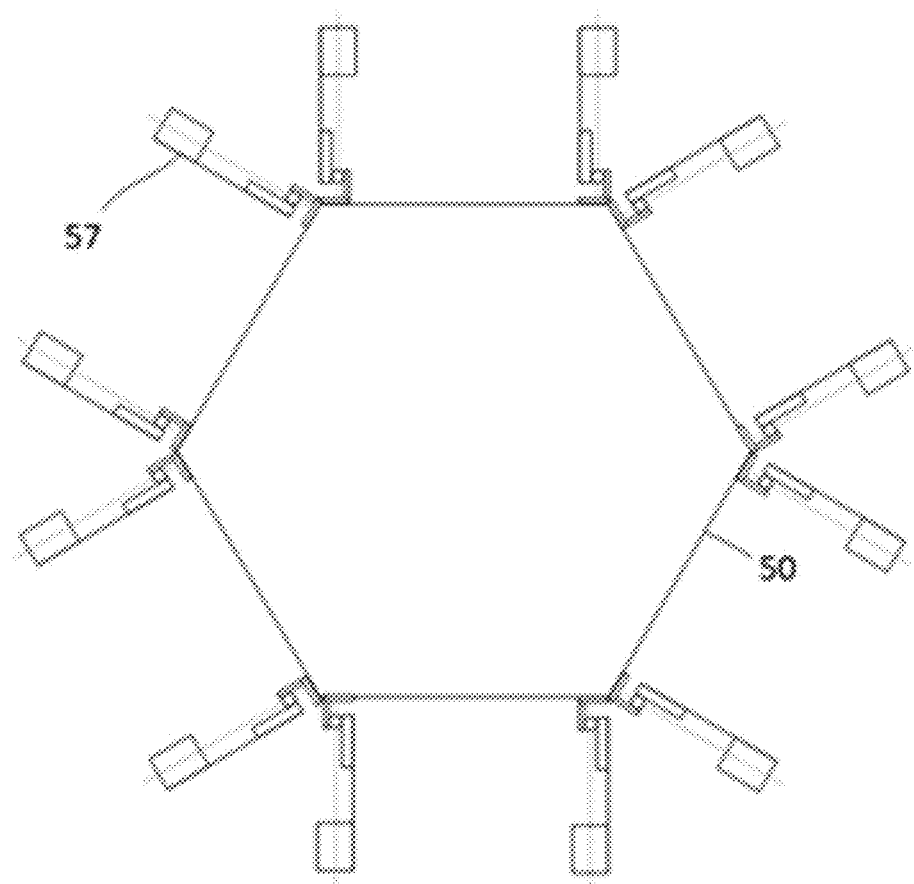
FIGS. 3O and 3P are a top and oblique view of a suspended cable robot having 6 groups of 4 cables arranged in a parallelogram (only one side shown).
Figure 3P:
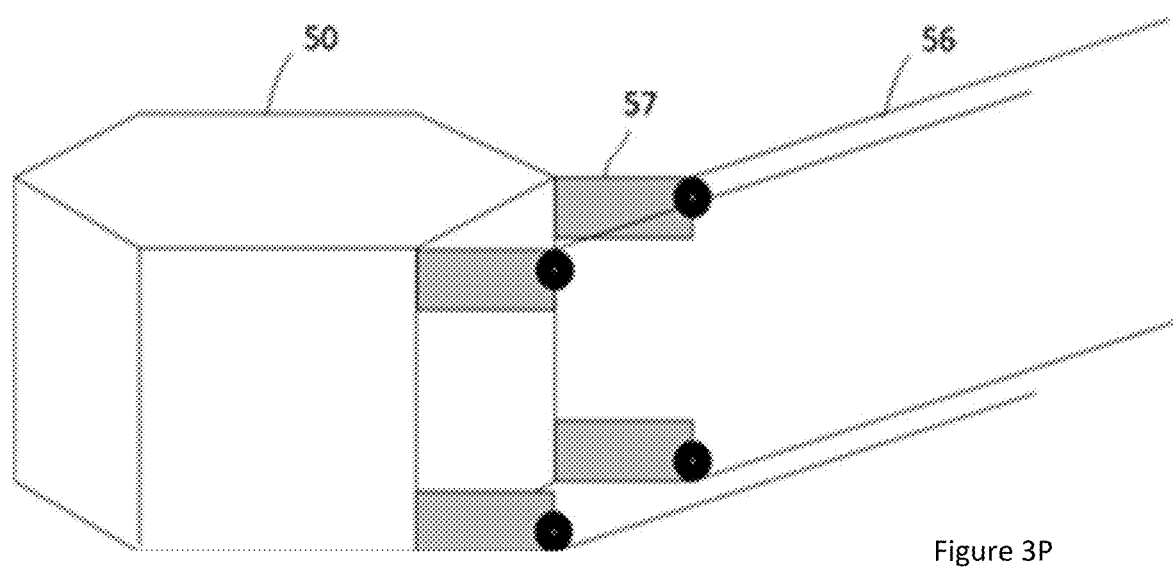

FIGS. 3a to 3p illustrate the case in which 3 or 4 cables are used per cable groups (51). FIGS. 3a, 3c, 3e, 3g, 3i, 3k, 3m, 3o are top views of the setups and FIGS. 3b, 3d, 3f, 3h, 3j, 3l, 3n, 3p are lateral views of one of the cable groups in the specific setup.

Figure 5A:
FIG. 5A shows an attachment platform in its simplest form, which is a plate where the specialized tool is attached.
Figure 5B:
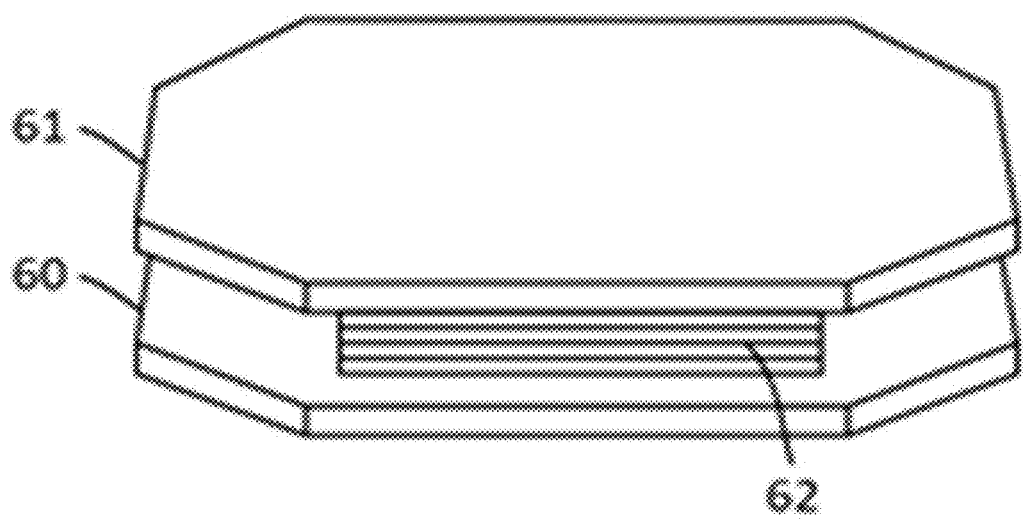
FIGS. 5B, 5C and 5D illustrate active versions of an exemplary attachment platform which can move sideways, up and down and in torsion to add precision to final position of the specialized tool.
Figure 5C:
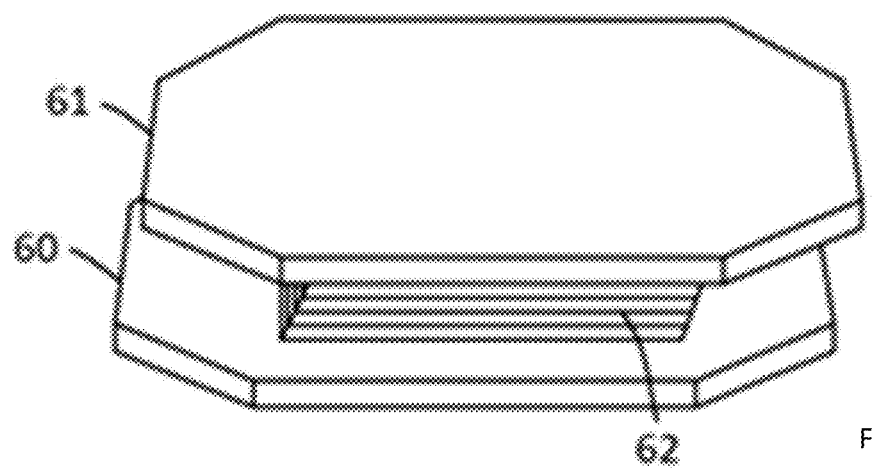
Figure 5D:
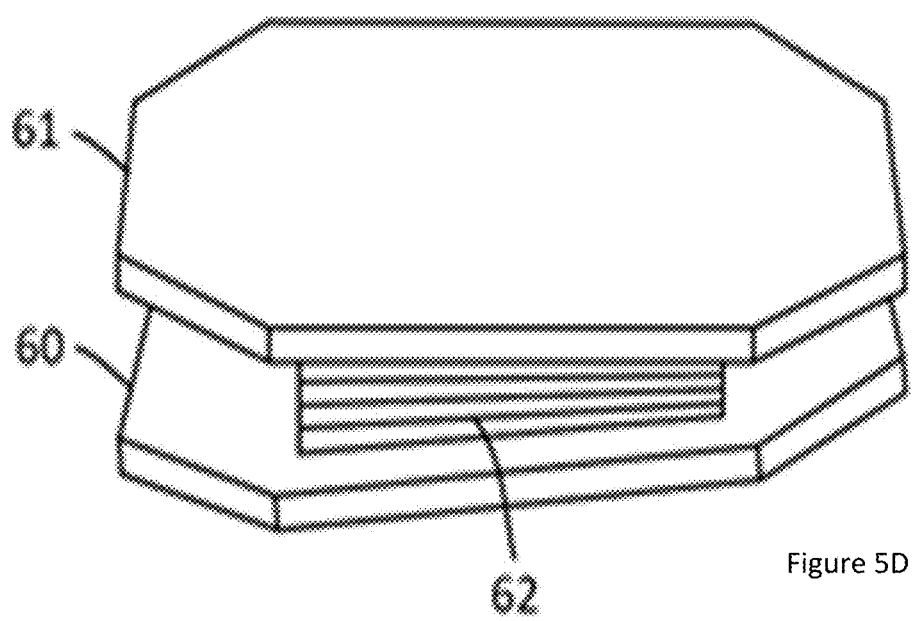
Figure 6:
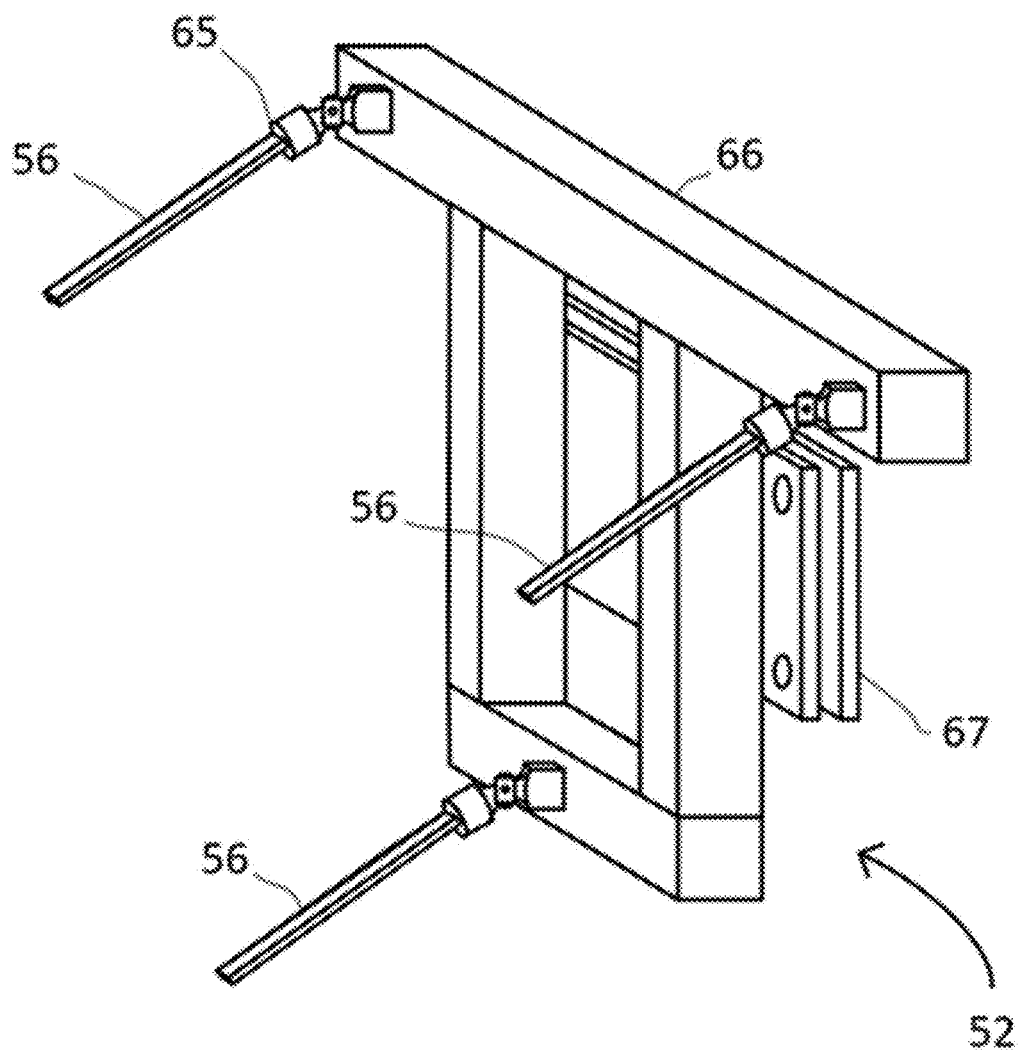
FIG. 6 represents an exemplary cable group anchorage.
Figure 7:
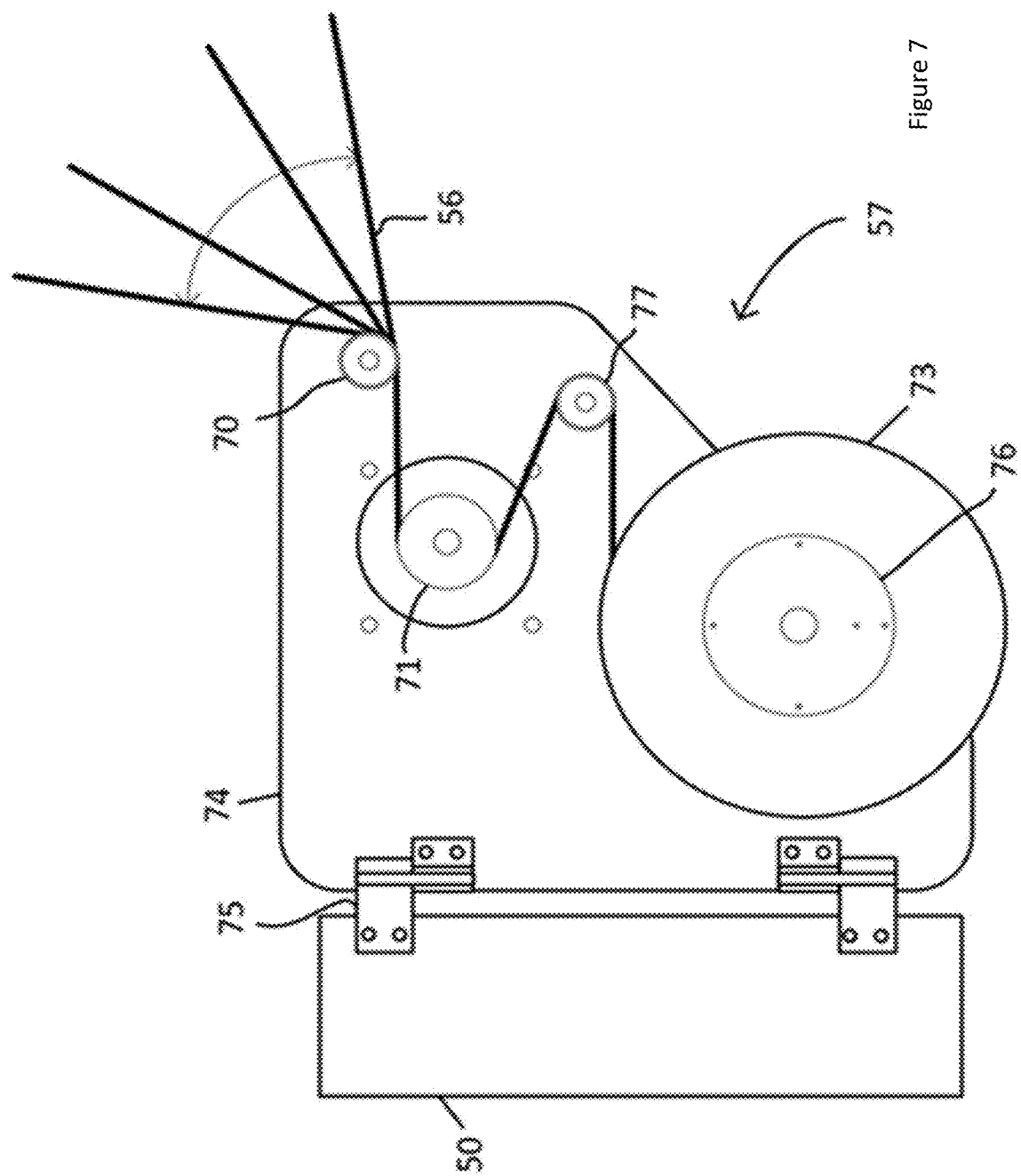
FIG. 7 represents an exemplary cable management module.
Figure 8A:
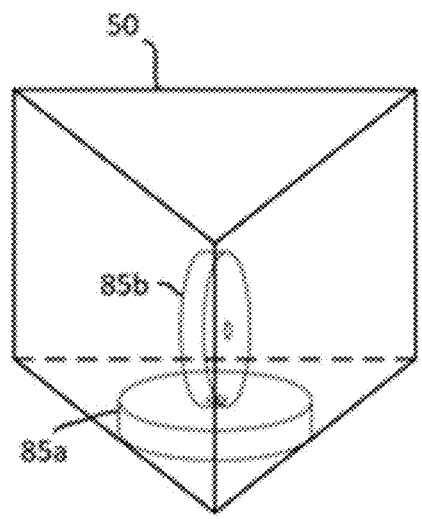
FIGS. 8A, 8B and 8C illustrate exemplary positions in which the stabilization gyroscopes can be installed to increase the dynamic stability of the central module.
Figure 8B:
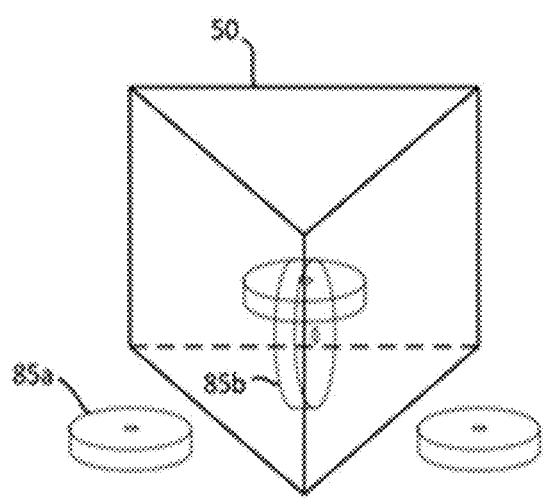
Figure 8C:
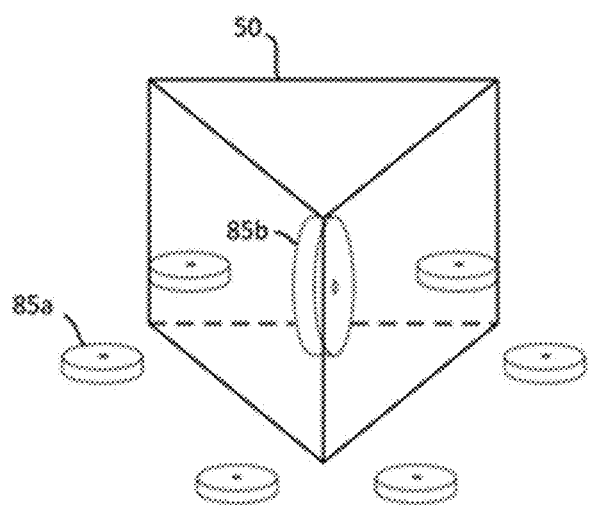
Figure 9:
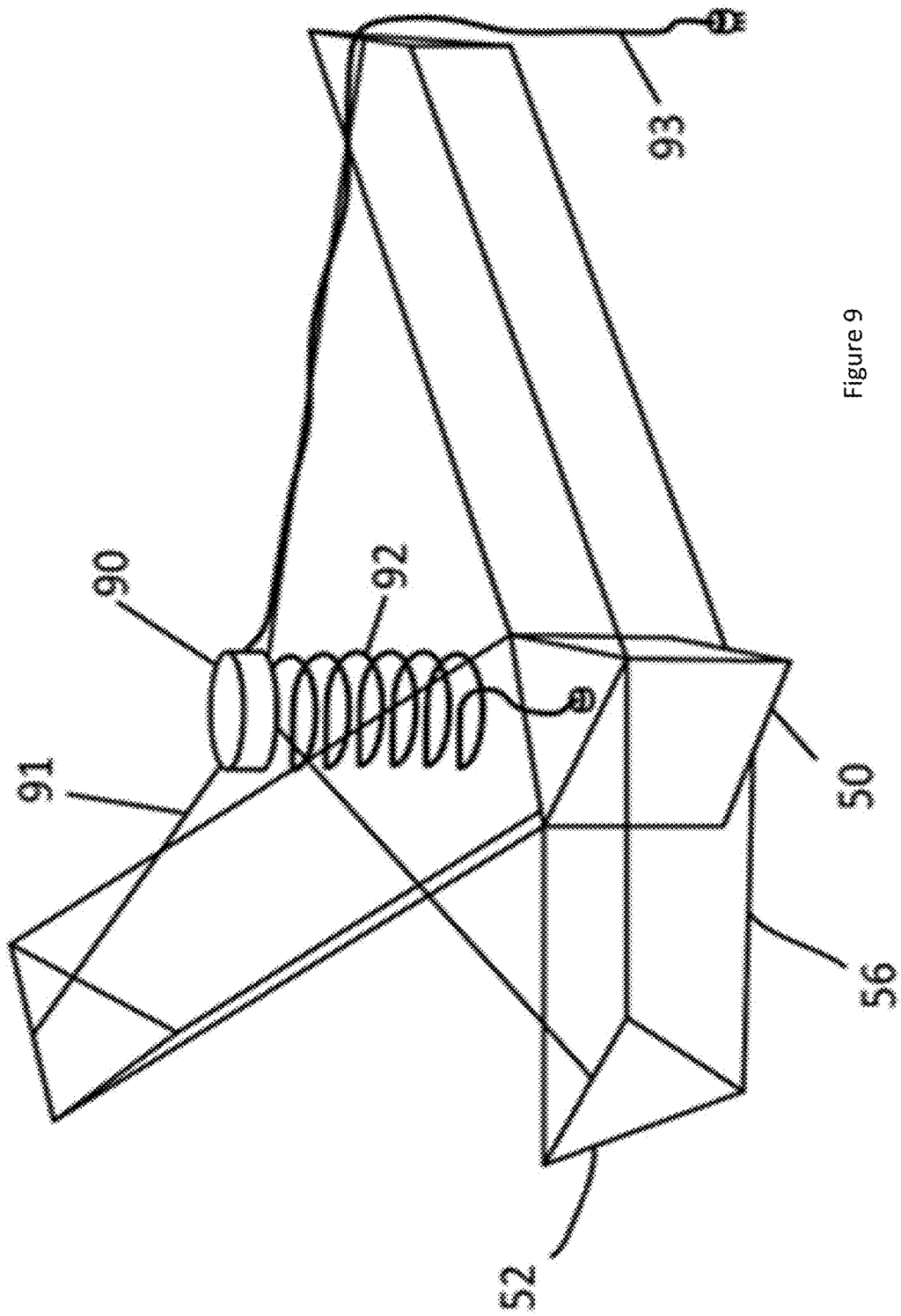
FIG. 9 represents an exemplary setup to bring power, such as electrical power, to the suspended robotic platform.
Figure 10:
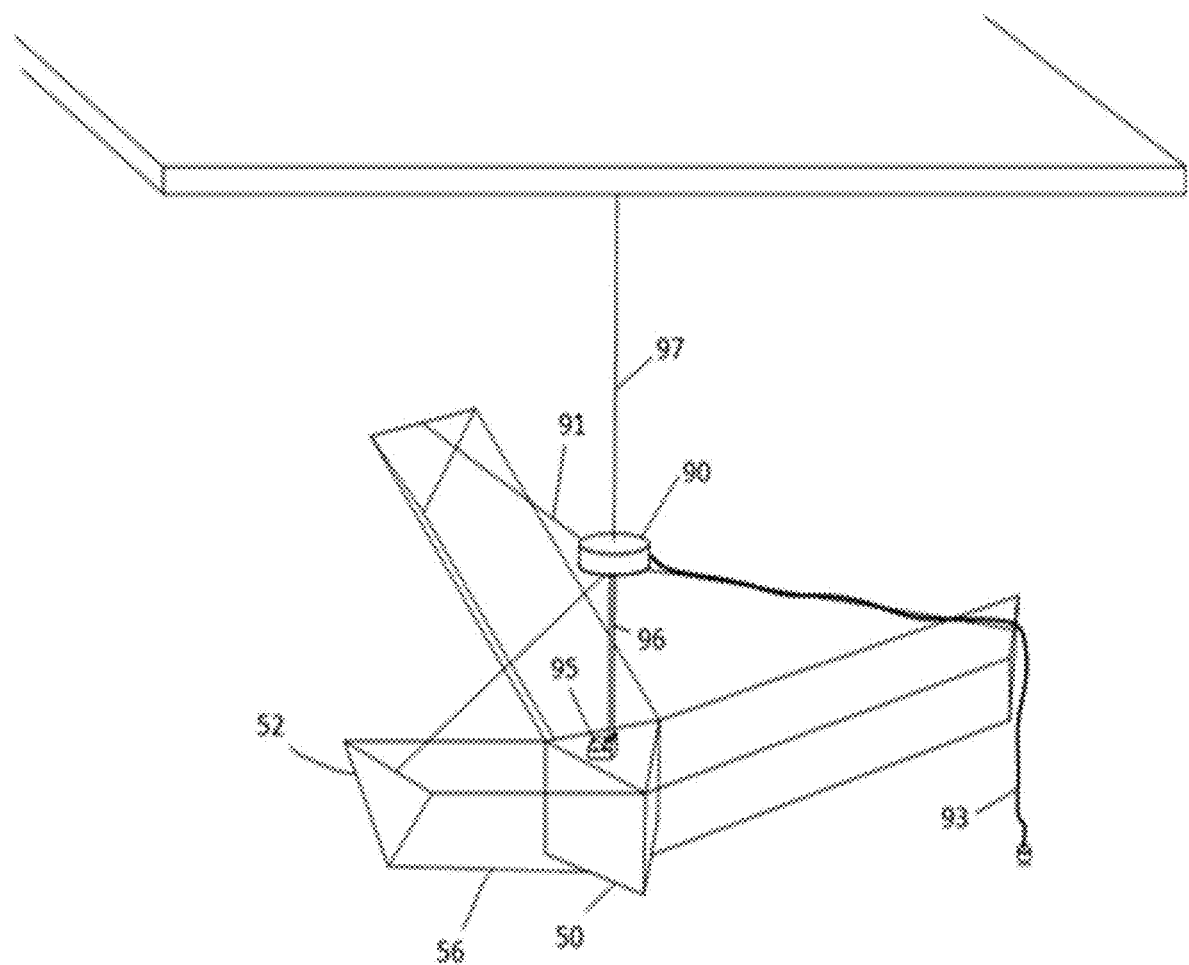
FIG. 10 illustrates an exemplary safety cable installation to support the central module.
Figure 11:
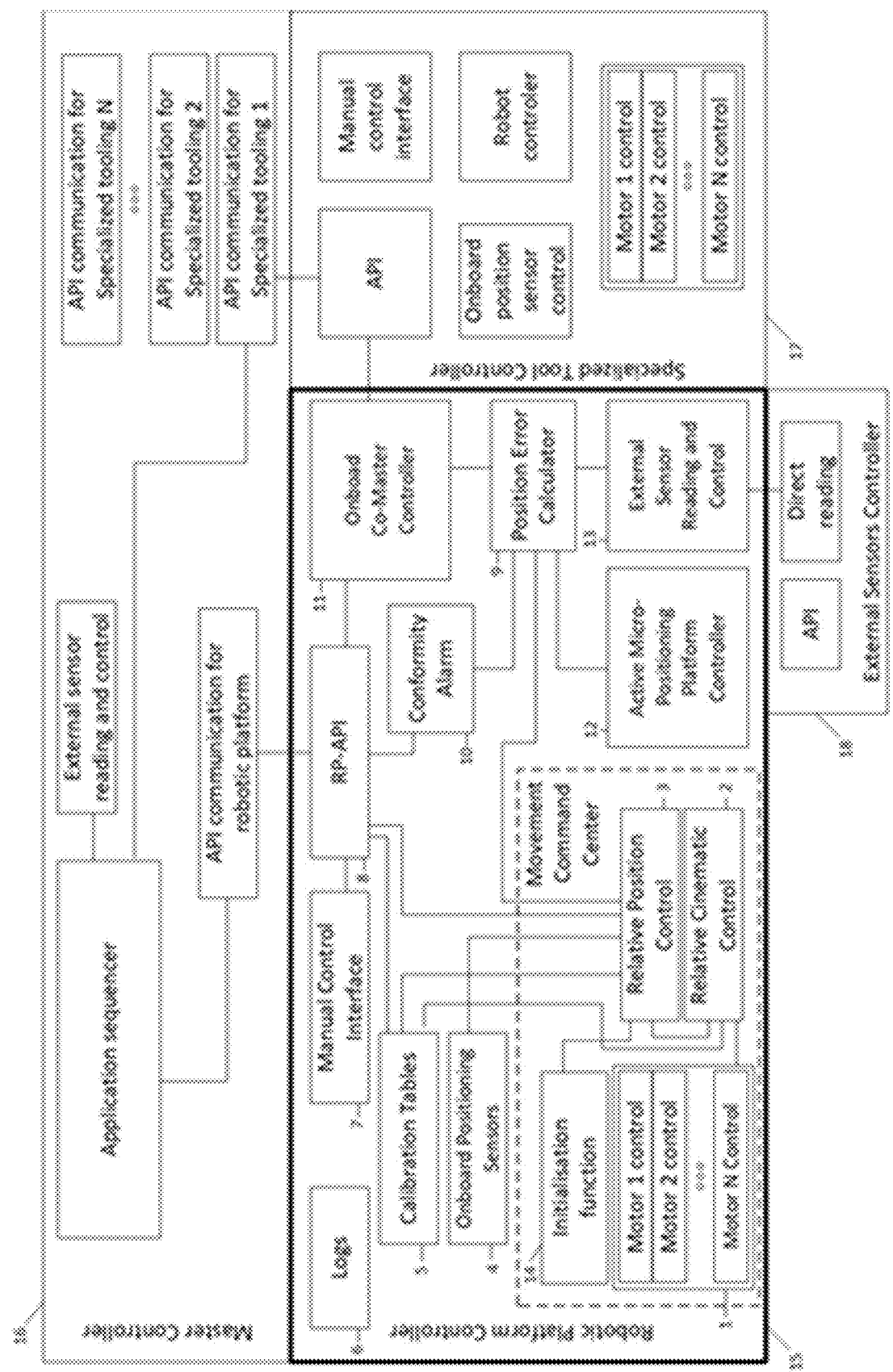
FIG. 11 shows an exemplary set of software modules required to operate the suspended robotic platform or that would exchange with it.
Figure 12:
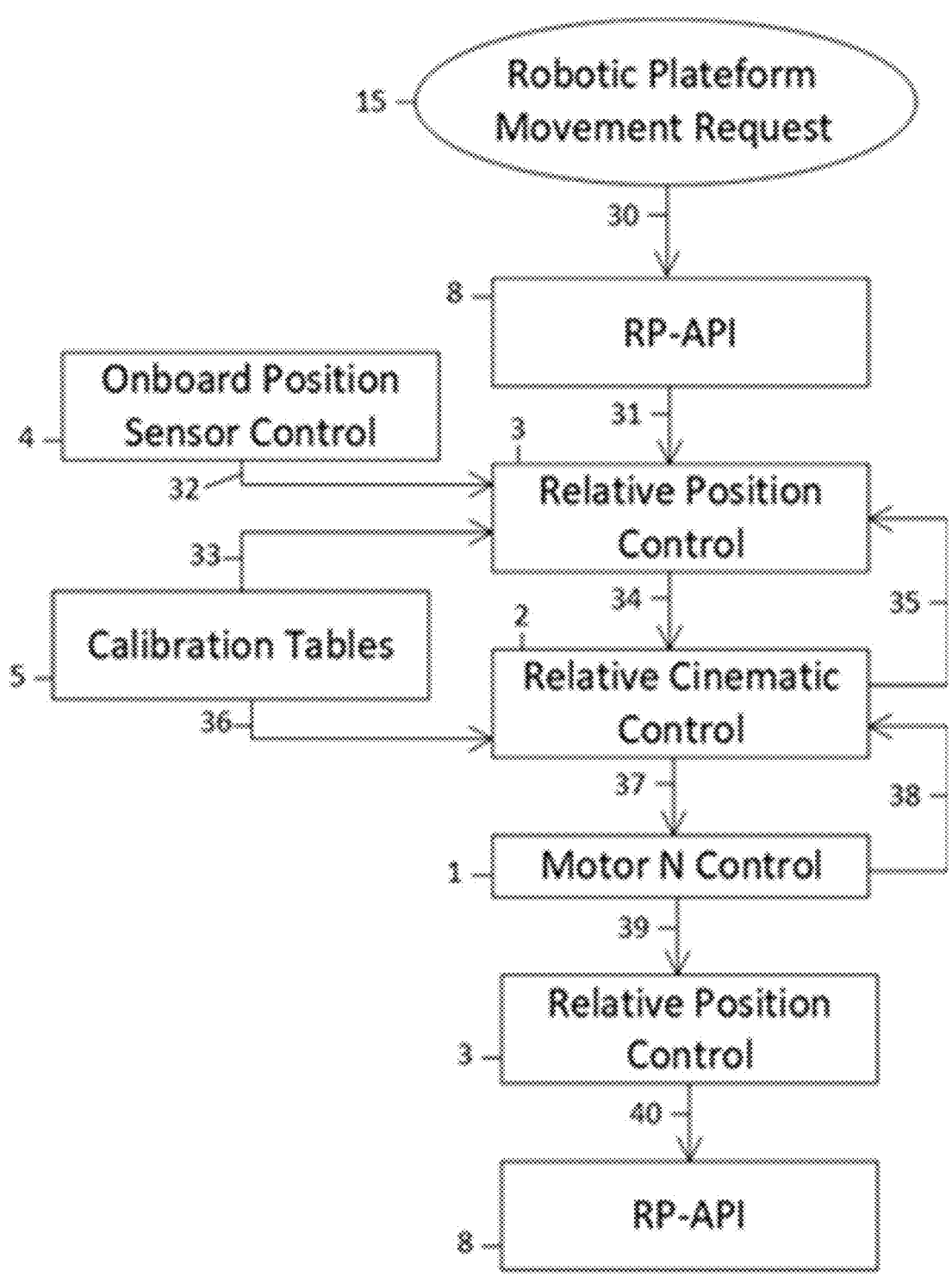
FIG. 12 represents an exemplary set of functional steps providing movement control when the suspended robotic platform is used.
Figure 13:
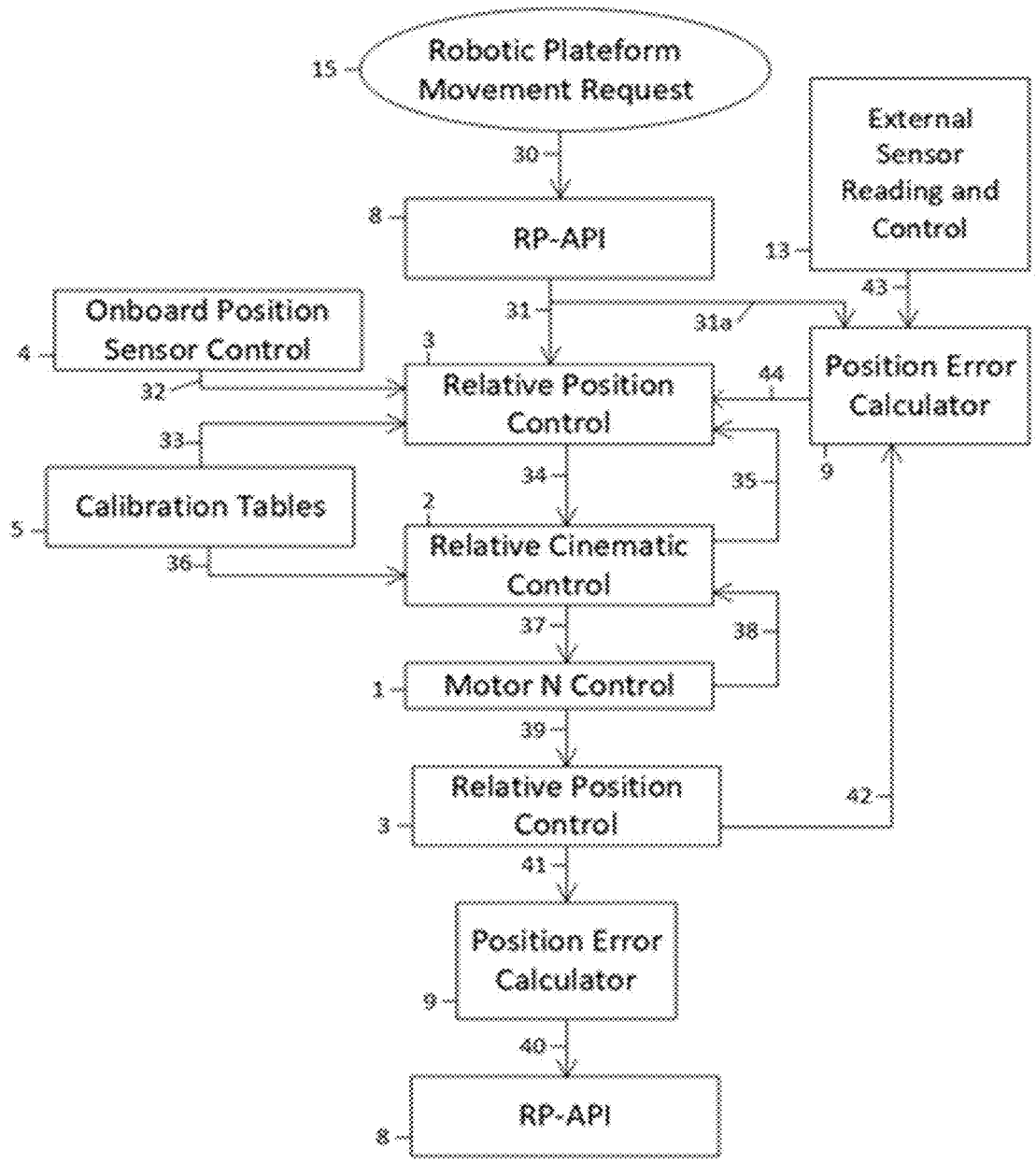
FIG. 13 represents an exemplary set of functional steps providing movement control when the suspended robotic platform is used with external sensors for position feedback.
Figure 14:
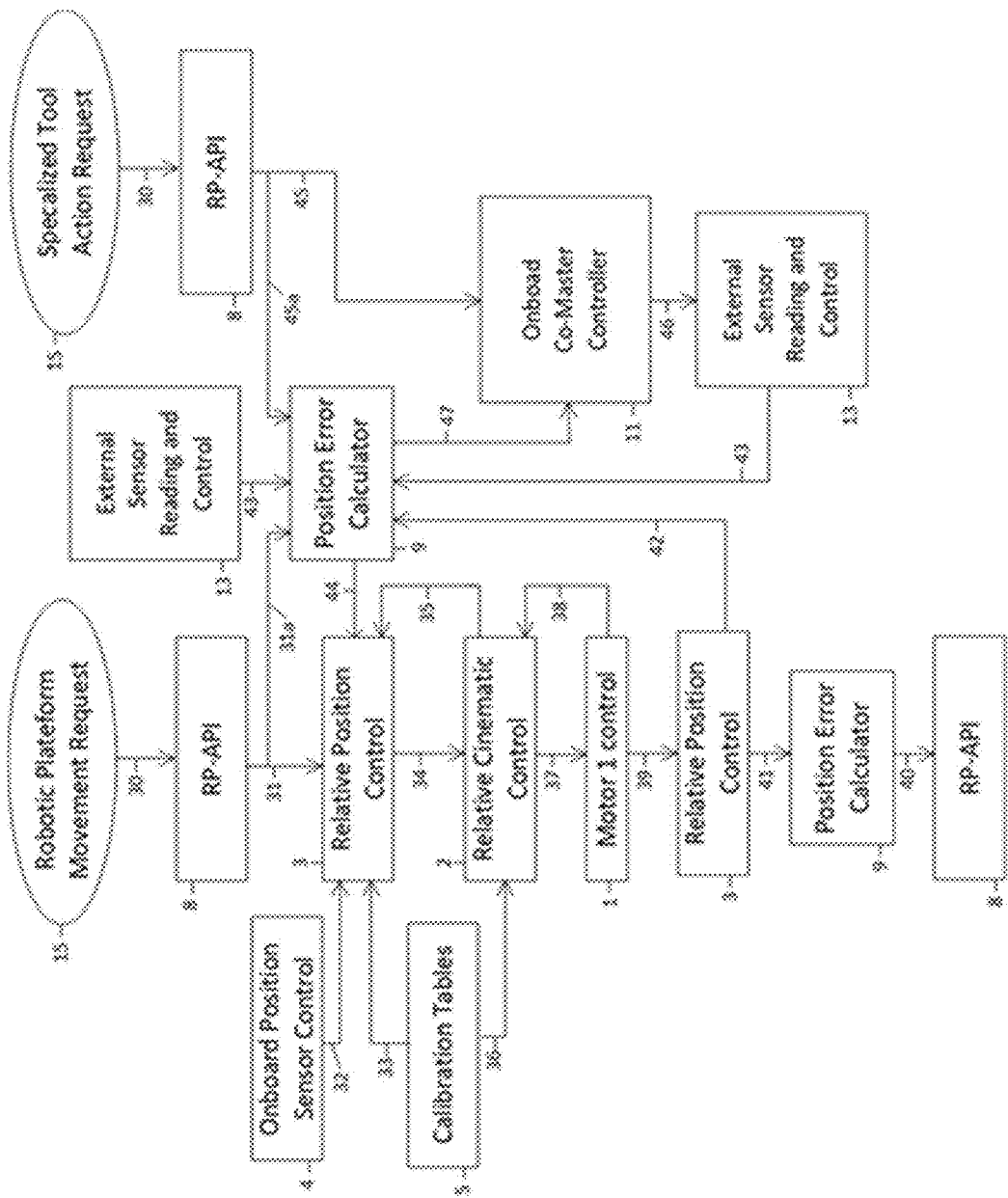
FIG. 14 represents an exemplary set of functional steps providing movement control when the suspended robotic platform precision is compensated by managing positioning of the specialized tool.
Figure 15:
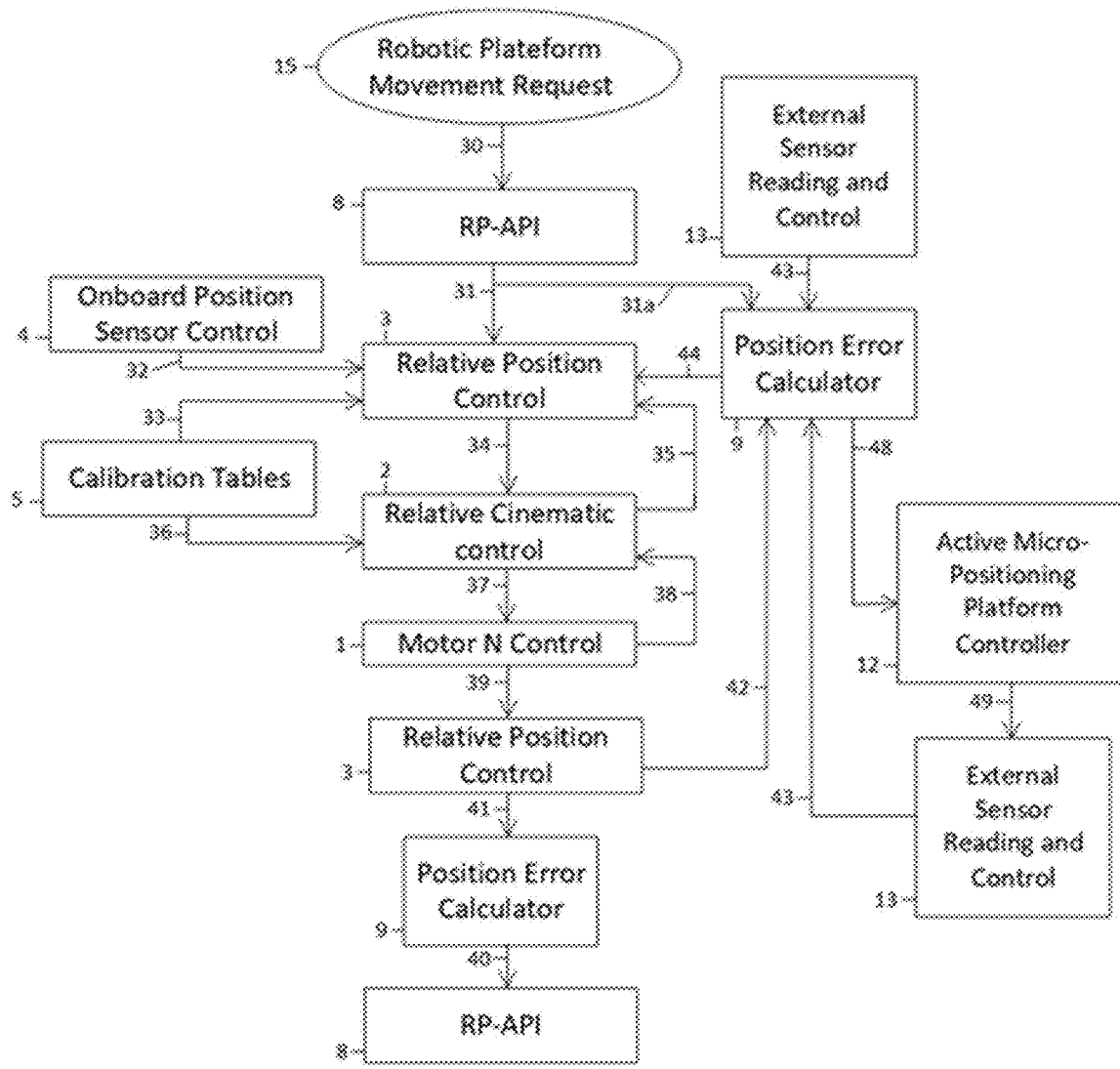
FIG. 15 represents an exemplary set of functional steps providing movement control when the suspended robotic platform is used with an active tooling attachment platform.

The central module (50) can support a specialized tool (53) which would most likely be under it but can also support specialized tools (53) on its top or sides. The platform (60) can also comprise an L-shaped or C-shaped arm member allowing a robot arm tool (53) to be mounted onto a conventional base on an upper side of a lower end of the arm. The specialized tool (53) can be directly installed on the central module through a passive tooling attachment platform (FIG. 5a), or can be mounted on an active tooling attachment platform (FIG. 5b, FIG. 5c, FIG. 5d).

The specialized tool may comprise a small industrial robot arm, such as a collaborative robot arm (cobot). Such a robot can have the motorized, jointed arm component, a gripper or end-effector component, a motor drive component and a control computer. The control computer can execute processor instructions to cause the robot to perform the desired actions that an operator defines. The central module (50) can house the robot components, whose weight can be useful in stabilizing the cable-supported suspended platform.

Tooling Attachment Platform

The tooling attachment platform (60) can be part of the central module (50) and can be passive or active.

A passive tooling attachment platform (60) can be a specialized assembly plate that connects a specialized tool (53) to the central module (50). It can be installed in a way to connect to the specialized tool (53) under the central module (50). In some cases, the plate passive tooling attachment platform (60) can take a specific form and be installed on the sides or top of the central module (50).

An active tooling attachment platform (FIG. 5b, FIG. 5c, FIG. 5d) can have the purpose of being auto-levelling, auto-positioned and auto-oriented through algorithms from independent sensors. It can also be adjusted in position by the robotic platform such that positioning and movement compensation can be done. It is constituted of a tooling attachment platform (60), a fastening plate (61) fixed to the central module and of actuators (62) that can adjust in position the tooling attachment platform (60).

Cable Group Anchorage

The cable group anchor (52) can be orientable to maintain the integrity of the parallelograms (80). Once oriented, they can sustain the tension of cables (56) in a way that does not compromise the robotic platform's stability by inserting new degrees of elastic bending. The cable group's anchor structure (66) can be strong in a way that it would add negligible elasticity to the cable groups (51) in every direction.

The cable fastener (65) on the cable group anchorage (52) can follow the tension direction without inducing cables (56) bending such that the cable never bends, for example by using a universal joint. The bending of the cables (56) depends on the tension and can compromise precision of positioning of the central module (50) and can induce more elasticity.

The cable group anchorage (52) can be installed at the attachment points (67) identified in the operational area according to the minimal structure stability requirements.

To maximize stability due to the parallelogram concept, the cable groups anchorage (52) can be inclined in a way that in each cable group, the top cable maximizes the distance with the bottom cable at any point of the operation area. The cable management module (57) can mirror the inclination by positioning the tension pulley (70).

Cable Management Module

The cable management module (57) can include the cable traction unit (71), the cable winding cassette (73) or spool, and the tension pulley (70) which can include the tension sensor and that is also used for final positioning of cables (56). It can be used to manage one (mostly) or up to all cables (56) of a cable group (51), according to the application, with one motor.

It can be attached to the central module (50) through passive hinges (75) that orient the entire cable management module (57) in the direction of the tension caused by the cables (56) configuration and by gravity. The tension sensors can also be installed on the top passive hinge (75). In this configuration, the bottom passive hinge (75) needs to be free to rotate towards the tension sensor position in the top passive hinge area. In certain cases, to maximize stability, an active hinge can be used to orientate the cable management module toward the cable group anchorage (52).

The cable traction unit (71) includes a motor that can be used in a direct shaft to minimize induced elasticity. In the case that a gear is used to reorient the motor direction, or that changes the rotation ratio, a low elastic coupling and a low windup gear system can be used. To lower the center of gravity of the robotic platform, the motors can be installed as low as possible on the cable management module (57).

The cable winding cassette (73) winds up the cable (56) as it is pulled by the cable traction unit (71). The winding orientation pulley (77) ensures that the cable is always well wrapped around the cable traction unit's (71) main pulley. The winding action by the cable winding cassette (73) can be managed passively by using a spiral spring assembly (76).

All of the components included in the cable management module (57) can be installed on the cable management structure (74).

To compensate for cable torsion at the end of each tension pulley, the cable management modules (57) managing the cable group (51) can be attached together in a way that they can continue to be oriented freely as a group toward the cable group anchor (52). To reduce the possible oscillations even more, a damping system can be attached the links.

Stabilization Gyroscopes

External disturbing forces or forces resulting from the specialized tool's momentum, combined with the elasticity of the cables, may influence the robotic platform's stability. These forces will mainly produce torques acting on the robotic platform on the x and y axes which will then be slightly off-axis because of the uneven tensions in the cables. Each cable will stretch differently producing a point of rotation initially at the center of the central module.

Consequently, a secondary element to stabilize the robotic platform can be the integration of stabilization gyroscopes (85a and 85b) positioned at certain points of the robotic platform. These stabilization gyroscopes (85a and 85b) can prevent some of the external interferences and influence the stability and the precision by countering axial movements on the central module (50). The precession force resulting from the stabilization gyroscope (85a and 85b) countering external torques produces slower angular additional torques that can be managed more easily with stabilisation algorithms applied at the cable traction unit (71). As an alternative, an independent gyroscopic system meant for rotary stabilization that compensates for precession can be used to counter the impact of external forces on stability.

To benefit from this concept across all torque possibilities, the robotic platform can include 1× central vertically oriented (by its axis) stabilization gyroscopes (85a) or 1× or 2× as many vertically oriented stabilization gyroscopes (85a) as there are cable groups (51) which would be installed on the cable management module (57). One horizontally oriented stabilization gyroscope (85b) can be installed in the central module (50) to counter torques disrupting the orientation of the central module (50).

Note that a stabilization gyroscope (85a and 85b) as defined herein can be simply a mass in the form of a disk that is balanced to turn at high speed without inducing vibration in the structure.

Safety Top Belt

The safety or security top belt (96) can suspend the central module (50) in the case where:
there is an emergency stop identified,
the robotic platform must be parked away from the operational environment
maintenance is required while it is suspended.

In all cases, the security top belt (96) can wind up using the belt winding mechanism (95) which can be done using a reel, actuated using a spiral spring, while the robotic platform is in operation. The tension on the security top belt (96) does not interfere with the robotic platform stability. The belt needs to be as long as the movement in the operational environment requires it, namely that the belt does not restrict the desired area coverage of the robotic platform. The use of a belt or cable (96) can also reduce tension, and thus stretching, of the cables (56) resulting from supporting the weight of the suspended robot during resting periods.

The security top belt (96) blocks in theses conditions:
Power is off,
One of the motors' power is cut,
Kill switch is pressed,
Soft kill switch is activated.

The belt winding mechanism (95) can be passive or active. In passive mode, the blocking system is by default activated and can be deactivated if a signal is properly received. In active mode, the security top belt (96) can include passive mode features and add a traction motor to provide a ceiling traction unit.

If the safety or security top belt (96) attaches to the suspended electrical box (90), an additional security anchor cable (97) can link to the ceiling or to another structure that can support the full weight of the robotic platform and its payload. This can be used to support the weight of the platform when the platform is not in use, so as to reduce stretching of the cables over time, particularly when the rest or parked position is chosen in a high up position, where the tension on the cable groups is much higher than a lower normal working position. The top belt can also be any support connected to the ceiling that the platform can connect to. When the top belt is not always connected to the platform but instead the platform connects to the top belt or support when it is time for the platform to be docked or parked. The platform can have any suitable connector for connecting to the top belt or support, such as an electromagnetic coupling, a hook and eye coupling, etc. The objective of the top belt system is to allow the platform to be suspended with most of its weight borne by the vertical top belt or support.

Power Management

In the embodiments in which the cable drives are centralized at the platform (50), the power requirements at the platform (50) can be substantial. Likewise, the end effector/robot arm system (53) can require substantial amounts of power.

The power source (93) may come from the operational environment and can be brought to the robotic platform. A power cable (92) can be brought to the robotic platform from the top using tensioned cable (91) that can be linked in the middle but over of the operational area to the suspended electrical box (90). These tensioned cables can be attached to the structure through the cable group anchorage (52).

If the cables (56) have an electrically conductive core and have a certified electrical insulation, the necessary power for the robotic platform can be received through these cables.

A battery can also be used to power the robotic platform when it is appropriate and meets the autonomy requirements for the application. Since it can be an advantage to have extra weight onboard the central platform (50), for stability purposes, extra battery weight can be suitable.

Stability Kinematic

The robotic platform can be stabilized in at least one of the following ways:
 1—Cable groups (51) disposed as parallelograms (80)
 2—Gyroscopes (85) adding high frequency stability
 3—Closed loop motor control using algorithms specific to this robotic platform.

Parallelogram's Macro-Stability

Macro-stability is directly induced by the parallelograms (80) when the cables are tensioned by gravity. At any position, the parallelograms force the central module (50) to be leveled (about the x and y axes) and oriented (about the z axis) in a certain direction and so counter, up to a certain level, any disrupting forces that would affect precision in motion. The parallelograms create a hysteresis in relation to the cable's angle (99), the parallelogram geometry and the central module (50) weight.

Parallelograms (80) procure a certain hysteresis effect when cable attachment points are at a certain distance from each other. Depending on the total weight, to enhance general stability required by the application, or for specific stability in corners, the distance between attachment points of the cable may be adapted.

Figure 16:
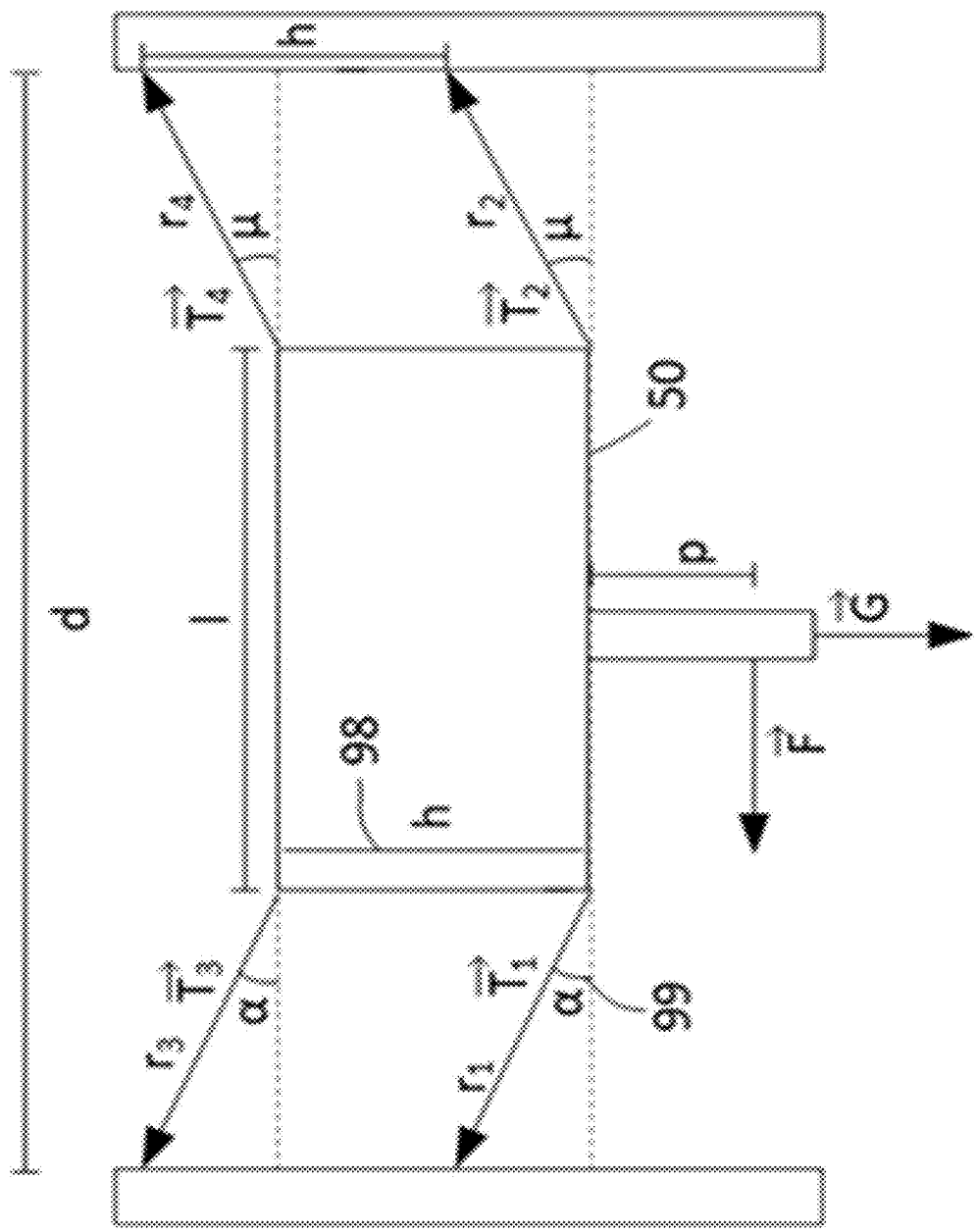
FIG. 16 shows the mathematical identification of the different components of the suspended robotic platform.

More precisely, about the x and y axes (FIG. 16, side view of the cable groups (51)), if the distance value (98) is high the parallelogram (80) will result in better hysteresis. The cable configuration with parallelograms (80) result in a sufficient lateral force to cause the central module (50) and its specialized tool (53) to lift. The action of hysteresis results from the 2 diametral opposed cables from opposed parallelograms.

Figure 17:
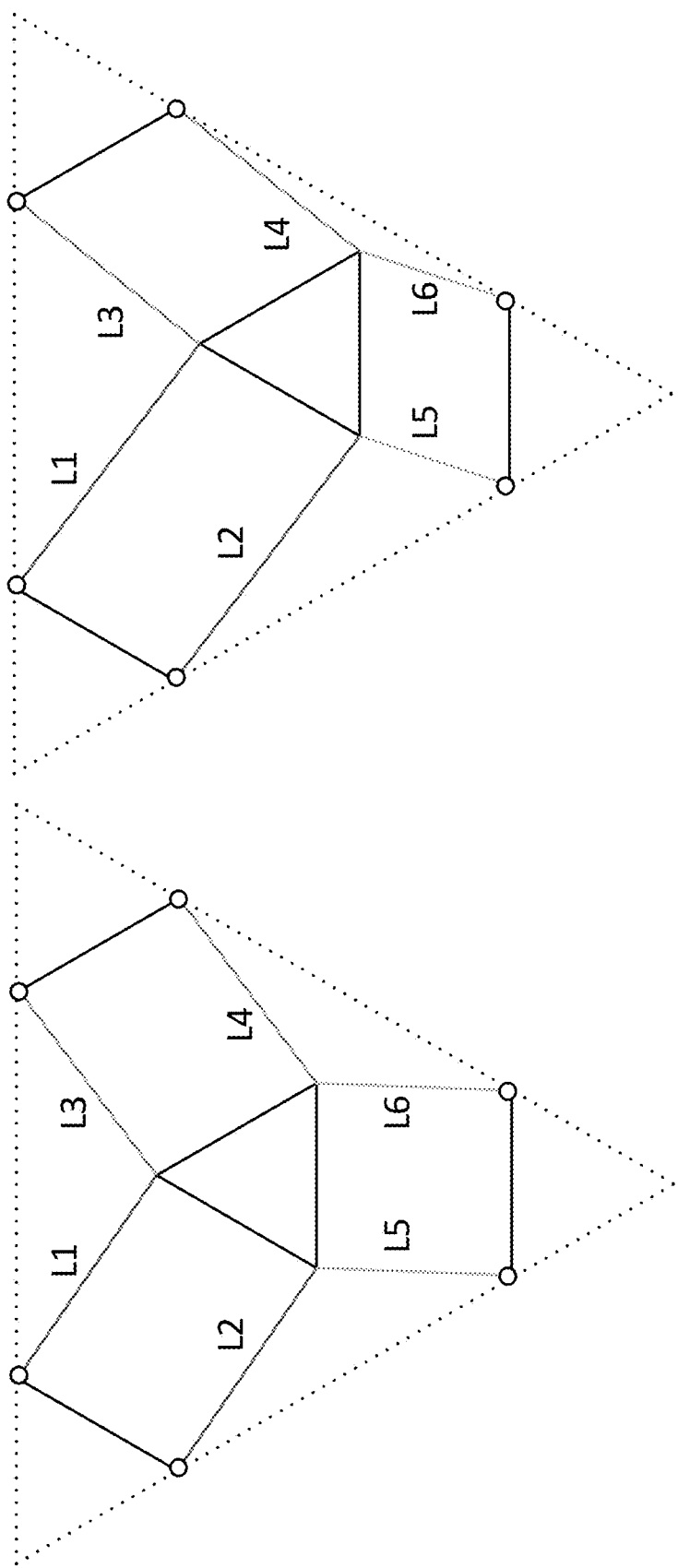
FIG. 17 shows the top view of the parallelogram effect on the central module.

The principle is similar regarding the orientation hysteresis about the z axis (FIG. 17, top view of the cable groups (51)). The cable tension imposes a movement following the edge of a sphere that lifts the central module (50) and its specialized tool (53).

When in movement, inertia of the robotic platform can affect stability and may therefore limit acceleration and deceleration of the central module to certain values. These values also depend on the cable's angles (central module position in space), the total suspended weight, the speed variations applied to the central module and the center of mass position and the variance due to the operating specialized tool (53).

Effect of Elasticity on Positioning and Movement

Elasticity could only depend on the cable's construction which is translated in an elasticity constant. However, where an operation area provides a low-quality cable group anchorage structure (66), some extra elasticity can add to the compensation complexity, in other words, the anchorage structure may add an elasticity component in the system which complexifies the compensation mechanism operation. In this case, tests on the support structure must be done to characterize any vectoral elasticity effects.

Elasticity can cause position imprecision and can make the central module oscillate. This elasticity constant can be used in stability algorithms and may also have a relation with cable length, cable angle, attachment point position, central module weight, central module dimensions and central module velocity.

To compensate for elasticity, one way is to add positioning sensors (54) on the central module (50) that can give a relative position feedback to the positioning algorithms. The positioning sensors (54) would be independent of the cables that suspend the central module (50). Many types of systems that have the necessary precision can be used, such as distance laser sensors and wire-actuated displacement encoders. Another way of effectively support absolute positioning is to have an independent positioning sensor (54) to set a reference in or outside the operation area. This active reference is a fix point that can be considered as an absolute reference and that gives feedback to the positioning algorithms.

Gyroscopes, disposed the way explained previously, can help attenuate the effect of elasticity on stability when the robotic platform's velocity changes (speed variation or direction changes).

Limitations

Lateral stability, which exists because of the lateral tension component in cables, is in relation with gravity effect on the central module (50) and the angle of cables. When the central module (50) is in the corners of the operation environment, 90-degree angles appears (in reference to horizontal) and some of the cables (56) cannot be laterally tensioned. This robotic platform cannot guarantee stability in this situation and so the area of operation can be confined to a smaller 3D space, limited by the maximum angles that the cables makes to procure the minimal lateral tension for the application. The robotic platform cannot operate with good stability beyond the area where its cables make 90-degree angles.

To solve some issues related to stability in corners, caused by a parallelogram (80) that becomes too lean, the cable group anchorage (52) can be inclined. This would also influence the position of cable management module (57).

There is also a limitation in reaching a certain height because the smallest the angle (99) of the cables with the horizon, the more the motors are working against each other. The maximum height depends on the application requirement and will imply using the appropriate motor sizing.

Initialization: Finding Robotic Platform's Position of Origin
 Calibration Minimal Requirements
  Characteristics of motor encoder: number of ticks, precision of motor
  Characteristics of the winding gear: circumference.
  Characteristics of the last tensioning gear: circumference, tension sensor flexibility Distance between the central module edge and the last tensioning gears
Dimension of the central module and relation to the point of reference
All distances between the last tensioning gears
Distance of the cables to a connection on the anchorage
Maximum tension allowed in the cables
Gyroscope and accelerometer precision
Theoretical cable tension data matrix at level vs position in space
Distortion of the external positioning system
Distortion in the accelerometer and in the tension sensors.
Initial Conditions
The robotic platform can be:
  On the floor
  Suspended in the center
  Suspended in an un-centralized position
Initialisation Sequence
1. Adjust the tension in the cables while finding level using 2 electronic level sensors
  a. Get initial level readings for both rotation
  b. Calibrate tension over top cables by pair.
  c. Set each bottom cable at the tension to get proper level
  d. Find the middle by having the same tension scheme in each top cable
  e. Get level readings for both rotation
  f. Loosen bottom cables
  g. Re-adjust tensions for each top cable
  h. Adjust tension on the bottom cables
2. Find relative position:
  a. by reading cable measurement stubs on the cables
  b. or, if positioning sensors are used on the central module, by getting the encoder's exact position reading
  c. or, if an external positioning sensor system is used, by getting feedback through a separate way.
3. Find the top max distance:
  a. by winding all the cables until the tension sensors hit the threshold value of the motor capacity. (Setting in the calibration data)
4. Find the floor distance with one of these methods:
  by lowering down the robotic platform slowly until the proxy switch is triggered.
  by measuring with a laser, the height distance from a reference beacon (which position is measured).
  by measuring the floor distance with a laser distance sensor.
  by knowing the distance from each of the cable group anchorage (52) to the reference floor (included in calibration data at installation)
5. Perform dynamic tests to validate resonances and adapt acceleration and deceleration constraints in relation with position.
6. Perform a sequence with specialized tool to adapts stability compensation algorithms.

Functional Diagram
Main Context of Usage

The robotic platform is used in a context where it contributes to a manufacturing or handling operation. This can include painting, welding, cutting, optical, X-ray or ultrasound inspection, object sorting, etc. The robotic platform can be controlled by a master controller (16) that is responsible for the full operation specific to the application. The robotic platform can be part of simple operation where it is central to the task or of a complex operation requiring many robots, many automated specialized tools and external sensors (18). The robotic platform can gather information through feedback from external sensors (18) that will assist it to achieve targeted precision of movement. To counter the possible incapacity of the robotic platform of getting the required precision, it is also capable of taking full or partial control of the specialised tool to do final adjustments to its movements or its positioning.

Description of the Master Controller

The master controller (16) is the entity that controls the various items that are used to perform an automated operation. It sends commands to the robotic platform controller (15) and to the specialized tool controller (17) and receives feedback from these entities to adjust its course of action. The master controller (16) can be considered as an orchestrator that considers all active elements in the automation solution.

Description of the Specialized tool Controller

The specialized tool controller (17) is the entity to which the master controller (16) gives commands to perform part of the manufacturing or handling operation. This tool is usually part of what would perform the specific processing in the manufacturing operation. The specialised tool is attached to the robotic platform and can also be controlled directly by the robotic platform controller (15).

Description of the External Sensor

The external sensor (18) is one or many devices that are not part of the robotic platform but that are used to feed the robotic platform with additional positioning and movement information. The information received will be processed to validate positioning or to add precision in the robotic platform movement.

Description of the Robotic Platform Controller
Part of the Movement Control Center.
Block 1: Motor N Control Modules The motor N control module (1) can control individually each motor depending on its type through the specific controller's API. Such a motor controller having an API interface is known in the art. It can send the commands to produce movement of a motor and acknowledge that the request has been successfully executed. The motor N control module (1) can be always aware of the motor rotary position by command accumulation and by feedback from encoders (or the motor controller's feedback), by the status of the limit switches and the status of the motor brake (or clutch). It can also be aware and consider the default settings, the minimum and the maximums of the motor capacities.

Each motor N control module (1) can receive its position, speed, accelerating and timestamp from the relative kinematic Control module (2). It must respect every parameter or send an error code. The Motor N control module (1) feeds back the executed distance after each movement.

Block 2: Relative Kinematic Control Module

The relative kinematic control module (2) can sequence requests to each motor N control module (1) to ensure that the movement path is respected in speed and in acceleration to obtain the final positioning. This module can consider the information received by the sensors and adjust the commands sent to each motor N control module (1) to ensure proper movement and positioning. This module can comprise a microcontroller with suitable code.

The relative kinematic control module (2) can send commands on a per-motor basis to the different motor N control module (1). Relative position control module (3) can have information on the robotic platform position and path and can be transmitted to the relative kinematic control module (2). Position can be in relation of a reference point on the robotic platform. Adjustment can be made while the onboard position sensor control module (4) gives feedback to the relative kinematic control module (2). The calibration tables (5) can give per motor pre-set metrics relative to the robotic platform's construction for the relative kinematic control module (2).

Block 3: Relative Position Control Module

The relative position control module (3) is the robotic platform's awareness of the position of the platform. It can receive the commands to move and determine, using the various information received in feedback, the compensation resulting in the new position.

This module need not comprehend the context of each motor. Most of the compensation instructions can be transmitted to the relative kinematic control module (2).

The RP-API (8) can transmit movement instructions from the master controller (16) to the relative position control module (3). The position error calculator (9) can give compiled and processed feedback from external sensors controller (18), from the specialized tool controller (17) and from the active platform controller (12) to adjust positioning of the robotic platform. The initialization function (14) can give the commands and receive the feedback to find positions in space. The calibration tables (5) can give overall pre-set metrics relative to the robotic platform's construction for the relative position control module (3). The onboard positioning sensors (4) can give constant feedback to the relative position control module (3) to adjust positioning of the robotic platform. The relative kinematic control module (2) can receive movement instructions from the relative position control module (3) and execute them.

Other Modules

Block 4: Onboard Positioning Sensors

The onboard positioning sensors (4) module can interface with various standard sensors used on the robotic platform to ensure its correct positioning. It can give a timestamp to all readings, accumulate them and transmit to other modules the requested values.

Sensor types can comprise one or more of:
Tension sensors
Cable (56) position sensors
Proxy switches (limit switches)
Accelerometers and electronic gyroscope sensors
Angle sensors
3D positioning system
Separate distance encoders This module can also store and retransmit values from the motors (current sense, rotary encoders)

The relative position control module (3) and the relative kinematic control (2) can receive position and stability information from the onboard positioning sensors (4) in a formatted and time stamped form.

Block 5: Calibration Tables

The calibration tables (5) may contain calibration parameters that are defined at manufacturing and stored in the robotic platform's memory.

Examples of calibration data that other modules can use:
Cable elasticity coefficient
Motor rotary settings and feedback configuration
Structure traction added elasticity
Structure torsion elasticity
Mechanicals characteristics (pulley diameter, distance between each cable management module).
Off-axis angles of the cable management module (57).
Parallelogram unevenness.

The relative position control module (3) can take into account the data in the calibration tables (5) to calculate its trajectory and fine tune its relative position. The relative kinematic control (2) can take into account the data in the calibration tables (5) to control the motor controller modules. The RP-API (8) can read and write in this module when in factory mode.

Block 6: Log Module

The log module (6) can store information from all modules, including all commands received from the master controller (15). Depending on the amount of space available to store logs, rotation of logs can be done depending on the type of information to retain.

Logs can be used for debugging purposes and to feed other monitoring modules (Onboard supervisor such as the position error calculator (9)_or from the master controller (16).

All modules can receive and store information relative to the function of the modules.

Block 7: Manual Control Interface

The manual control interface (7) can be a GUI that allows for manual steering of the robotic platform. The GUI can be a web page and can be accessed directly on the onboard PC or can be remotely accessed with the help of a browser using a Wi-Fi connection (this module can be supported on a web server).

The RP-API (8) can receive movement instructions from the manual control interface (7) as if they where sent from the master controller (16).

Block 8: RP-API

The RP-API (8) (Robotic Platform Application Protocol Interface) is the interface with which the master controller (15) can communicate with the robotic platform. All commands can be pre-defined. The RP-API (8) can receive instructions or give back information to the master controller (15). A time stamp can be associated with each request.

The RP-API (8) can have commands that interact with each module included in the robotic platform controller (15), for configuration purposes. For movement requests, it can act mainly with the relative position control module (3).

Optional Modules

Block 9: Positioning Error Calculator

The positioning error calculator (9) can act as the precision supervisor for positioning and movement. The module can receive absolute positioning information from the external sensor reading and control (13) and can be aware of the positioning context of the relative position control module (3). Through data aggregation and calculation, this module can give feedback to the relative position control module (3) to reduce the gap between the relative position to the absolute position.

When compliance with precision requirements is impossible just using the robotic platform, it can:
create an alarm that stops the robotic platform
feed commands to the specialized tools (53) through the on-board co-master controller (11) to adjust the tip position in regards of the position variation.
feed commands to the active tooling attachment platform (60) to reduce the gap with the position differences.

The module can also correct paths while moving and not only for a final position. This module can be managed using artificial intelligence.

Sensor information coming from the external sensor reading and control (13) must be validated by the positioning error calculator (9) with the all other feedback to ensure that the absolute positioning calculation is the most relevant. The positioning error calculator (9) module gives movement instructions to the relative position control module (3) to adjust positioning according to the external sensors (18). The positioning error calculator (9) gives positioning information to the active micro-positioning platform controller (12) to adjust position to the specialised tool. The positioning error calculator (9) give positioning information to the on-board co-master controller (11) to do specific adjustments of the position of the specialized tools (53). The positioning error calculator (9) sends an error code to the conformity alarm module (10) if it cannot resorb position or movement errors with the various actions it can take.

Block 10: Conformity Alarm Module

The conformity alarm module (10) can be the only module responsible for stopping the robotic platform or to execute an overriding sequence of commands. This module can be used for all safety and security processes in reaction to all non-conformities. Errors detected can be cleared by the master controller (16).

The positioning error calculator (9) can send a command to the conformity alarm module (10) if it cannot resorb position or movement error with its various actions it can take. The RP-API can retransmit the conformity alarm module's (10) information to the master controller (16).

Block 11: Onboard Co-Master Controller

The onboard co-master controller (11) for specialized tools is an interface included in the robotic platform that communicates commands for the specialized tools (53). It can be driven by the master controller (16) or by the positioning error calculator (9). This module can serve the needs of implementing position and movement corrections at the specialized tools' (53) level to ensure an accuracy that is higher than the robotic platform can sustain. It can also be used to ensure coordinated movements between the robotic platform and specialized tools (53).

The positioning error calculator (9) can transmit, to the onboard co-master controller (11), the position of movement error correction that can be required to obtain the correct precision. The RP-API can retransmit the commands from the master controller (16) to the onboard co-master controller (11).

Block 12: Active Micro-Positioning Platform Controller

The robotic platform can include an attachment platform where the specialized tools (53) can be attached. In the case the attachment platform is active, through commands, the active micro-positioning platform controller (12) can carry out the signals that control the active platform.

The positioning error calculator (9) can indicate, to the active micro-positioning platform controller (12), the position and movement adjustments to achieve the required precision.

Block 13: External Sensor Reading and Control

The external sensor reading and control (13) can take information of external sensors that have been added to the application to ensure better absolute positioning or movement acquisition. The external sensor reading and control (13) can also have the ability to configure these sensors in order to get from them the required information.

The positioning error calculator (9) can receive in input the readings made by the external sensors (54) and control module inputs.

It will be understood that many of the blocks or modules described herein can be implemented using software stored in a computer memory and executed by a processor, in addition to being implemented using dedicated control logic.

Variants of Movement Commands

Flow 1: Commanded Direct Movement Execution

30—The master controller (16) requests the robotic platform to perform a movement towards a specific position.

31—The robotic platform acknowledges the request and sends the instructions, in a standardized way, to the relative position control module (3).

32—The relative position control module (3) refers to the onboard positioning sensors (4) to calculate the movement to be done.

33—The onboard positioning sensors (4) refer to the calibration tables (5) to calculate the movement to be done.

34—The onboard positioning sensors (4) send out the segmented movements to the relative kinematic control module (2).

35—The relative kinematic control module (2) gives feedback to the relative position control module (3) over feasibility and on actual movement details.

36—The relative position control module (3) refers to the calibration tables (5) to calculate the movement to be done for each motor.

37—The relative position control module (3) sends out standardized commands per motor N control module (1) to generate movement.

38—The motor N control module (1) sends back information on position and movement such that the relative position control module (3) can validate the movement and acknowledges the command.

39—Once the movement is completed, the relative position control module (3) is informed that the request is completed.

40—RP-API (8) is informed and ready to transmit the movement completion status to the master controller (16).

Flow 2: Commanded Direct Movement Execution with External Feedback

31a—The positioning error calculator (9) is also informed of the movement requested from the master controller (16).

43—The positioning error calculator (9) is informed from the external positioning feedback.

44—The positioning error calculator (9) informs constantly the relative position control module (3) of its version of the position 42—Once the movement is done, the relative position control module (3) gives feedback to the positioning error calculator (9).

41—If the final positioning is correct, the positioning error calculator (9) informs the master controller (16).

Flow 3: Commanded Movement Execution with Specialized Tool Management.

45—RP-API (8) gives normalized instructions to the onboard co-master controller (11).

45a—The RP-API (8) informs the positioning error calculator (9) of the specialized tools (53) commands to validate the error on expected result.

46—Movement produced on the specialized tools (53) affect readings from the external sensors (54).

47—The positioning error calculator (9) gives specific instructions to the onboard co-master controller (11) to adjust the specialized tools (53) according to the final positioning requested.

Flow 4: Commanded Movement Execution with Active Attachment Platform Micro-Positioning.

48—The positioning error calculator (9) orients the active attachment platform to fill the gap with the positioning instruction.

49—The external sensors (54) are influenced by the active tooling attachment platform (60) adjusted orientation.

Control Variants for Applicative Usage

The suspended robotic platform can be used in many applications which can be separated in at least four integration use cases in an automation solution.

Figure 18:
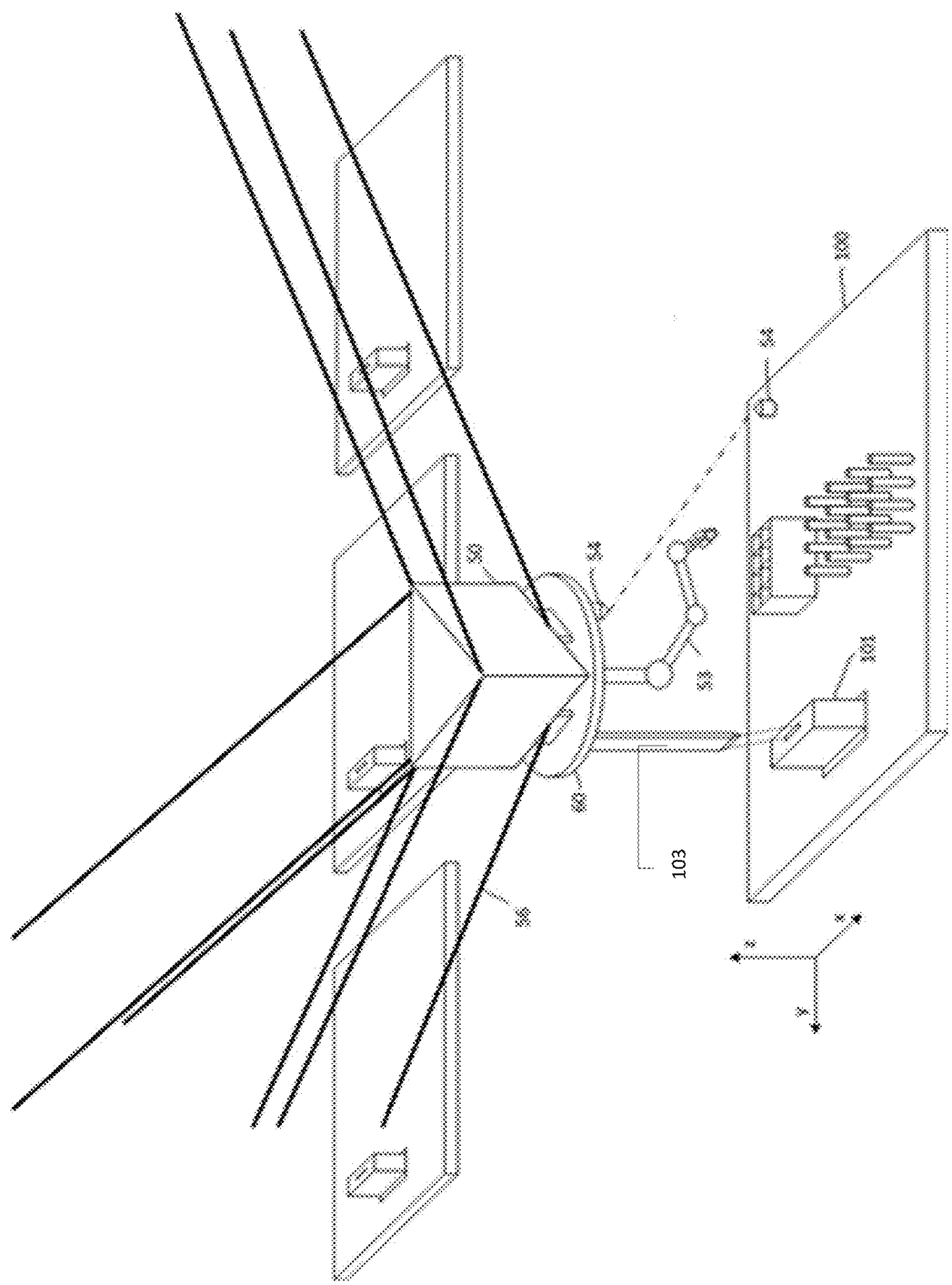
FIG. 18 is an oblique view of a cable robot that includes a stabilizing arm that mates with one of a number of complementary bases mounted to a floor or tables.

1. The suspended robotic platform can be used to position a specialised tool (53) at different workstations (100), as shown in FIG. 18.
2. The suspended robotic platform can transport the specialised tool (53) to a workstation (100) and leave in place for it to perform its operation.
3. The suspended robotic platform can also be directly involved in the application by bringing range to the specialised tool (53) by positioning it at different point of the same workstation.
4. The suspended robotic platform can perform a combined movement with the specialized tool (53) to execute the full operation.

A complete solution using a suspended robotic platform can be a mix of some or all of theses above use cases.

In these embodiments, the nature of the robotic platform can be simplified over the embodiments previously described in this patent application, since the stability of the robotic arm (53) will come from a support base (101) rather than the cables (56). For example, three cables (56) providing a range of motion similar to embodiments described above but without offering the same stability can be used to move the robotic arm from station to station in an efficient manner.

The leg member (103) is shown in FIG. 18 as a single fixed leg that is received within a mounting socket or racking (101). It will be appreciated that the leg member (103) can be fixed or retractable so as to be out of a range of movement of an arm (53), and it can be a single leg member or it can be two or more members. In the case that there are three legs (103) the leg members can engage a surface such as (100) without needing a docking socket (101). It will also be appreciated that the socket (101) can include a locking mechanism to provide stability and precision to the platform (60). The locking mechanism can be, for example, an electromagnetic lock, a solenoid actuated pin or a motorized threaded locking mechanism. Such a lock can be controlled by the robotic platform controller.

In all of these use cases, an orchestrator (16) can control the suspended robotic platform, the specialised tool (53) and all other automated devices or sensors that are used at each workstation. This orchestrator (16), also called a master controller (16), can be implemented as part of the suspended robotic platform application software or can be a third-party application software.

Displacement of a Specialized Tool from Workstation to Another Workstation (FIG. 18)

This application displacement is characterised by the fact that the specialised tool (53) can be shared on many workstations. The suspended robotic platform may carry to a precise position the specialized tool (53) from one workstation to another. At each destination the specialised tool (53) can perform its operation from the robotic platform while the latter stays still. The position of the suspended robotic platform can either be stated by its absolute position in space or by referring to position beacon (54) at each workstation (100). The use of a wireless location beacon can be replaced by machine vision or other precision location technology for the purposes of guiding the platform (60) to find its anchor or racking dock (101).

The suspended robotic platform's inherent stability when still can satisfy the stability characteristics required by the specialized tool (53) to perform the operation at each workstation (100). In the case it does not fulfill the minimal requirements, the suspended robotic platform can position itself to connect on an active or inactive socket or racking system (101) that will bring rigidity to the specialised tool (53) once at the workstation (100).

Exemplary Sequence

1—The suspended robotic platform is asked to perform a certain displacement toward a final position.
2—The suspended robotic platform acknowledges to the orchestrator (16) that it has reached the requested position. It can also transmit the position error value.
3—The orchestrator (16) can initialise the specialised tool to be precise with respect to the new position referential. The orchestrator (16) may rely on other sensors and beacons to add precision or instructions to the specialised tool (53).
4—Specialised tool performs its operation. Once finished, it acknowledges to the orchestrator (16) that it can go to the next destination.
5—Back to step 1.

Transport of a Specialized Tool from Workstation to Another Workstation with Disengagement of the Tool from the Platform (FIG. 19)

This embodiment is also characterised by the fact that the specialised tool (53) can be shared or used at many workstations (100). The suspended robotic platform (60) can carry to a precise position the specialized tool (53) from one workstation (100) to another but leave the specialized tool (53) at the workstation. The specialised tool (53) can be installed on a detachable platform with an appropriate release mechanism (102). The separation of the specialised tool (53) from the robotic platform requires using an active or inactive racking system (101) at the workstation (100). The components of the robot system that are normally provided within the module (50) can be located on the detachable structure so as to remain connected to the tool (53). The base or socket 101 can also provide power and/or data connectivity to the robotic arm and optionally its components when detached from the platform (60). In this particular case, the suspended robotic platform (60) can stay in standby while the specialised tool (53) performs its operation or can be used to transport other specialised tools (53) at another workstation. The standby position can be fully retracted to an out-of-the-way position. This can be useful to free up the area where the robot is working for an operator to stand next to the robot to inspect or monitor the progress of the robot. The suspended robotic platform can carry or transport many specialised tools at the same time depending on the automation solution it has been meant for.

Exemplary Sequence

1—The suspended robotic platform can be requested to perform a given displacement toward a final position.
2—The suspended robotic platform can acknowledge to the orchestrator (16) that it has reached the requested position. A sensor may announce to the orchestrator that the specialised tool has reached the correct position in relation with the racking system (101).
3—The specialised tool (53) can be released from the suspended robotic platform once attached properly to the racking system (101).
4—The orchestrator (16) initialises the specialised tool to be precise with respect to the new position referential. The orchestrator may rely on other sensors and beacons to add precision or instructions to the specialised tool (53).

5—The specialised tool (53) can perform its operation. Once finished, it can acknowledge to the orchestrator (16) that it can go to the next step.

6—The suspended robotic platform (60) may come back to grab the specialised tool (53). The specialised tool can be attached to the suspended robotic platform by inverted activation of the release mechanism (102) and detached from the racking system (101).

7—Back to step 1.

Sequenced Combined Displacement

This displacement is similar to the one defined to go from a workstation to another but is targeted to a positioning sequence inside the same workstation (100). The orchestrator must respect the same context of operation by making requests for different positions to the suspended robotic platform while the specialised tool (53) performs operations. All active elements of the automated solution can be moving at the same time, but the suspended robotic platform is not required to have precision while transiting from one position to the other. Absolute position or positioning beacons (54) can be used to support destination precision of all required movements in the operation. To add stability to specialized tool (53), it can connect on one or many active or passive racking system (101) along the course.

Exemplary Sequence

1—The suspended robotic platform is requested to perform a given displacement toward a final position.

2—The suspended robotic platform acknowledges to the orchestrator that it has reached the requested position. It can also transmit the error value. While reaching the position, the specialised tool (53) can be prepared for its next operation.

3—The orchestrator can initialise specialised tool (53) to be precise with respect to the new position referential. The orchestrator may rely on other sensors and beacons to add precision or instructions to the specialised tool (53).

4—Specialised tool (53) performs it operation. Once finished, it acknowledges to the orchestrator that it can go to the next operation.

5—Back to step 1.

Continued Combined Displacement

The suspended robotic platform can be used to add movement range to a specialised tool making it do operations that normally would not be possible. By combining the 3D displacement capabilities of the suspended robotic platform and the possible movements of the specialised tool (53), the robotic solution be used in precision operations on a large-scale workstation (100). To do so, the positioning can be done by absolute positioning or by referring to one or more positioning beacons (54) placed along the course of action. In these conditions, the suspended robotic platform can support one or many specialized tools (53) depending on the automation solution.

What is claimed is:

1. A cable robot platform apparatus comprising:
    a platform member;
    a robotic arm connected to said platform member;
    an end effector connected to said robotic arm;
    a workstation engagement member connected to said platform member;
    at least three cables extendable in use between the platform member and a wall or ceiling anchor, wherein said platform member can be suspended using said cables;
    a drive associated with each of said cables operable to control a length of said cables between said platform member and said anchor; and
    a controller having a processor and nontransient memory storing processor instructions that when executed by the processor cause:
        said drive to position said platform member to a first workstation;
        for stabilizing said platform member, one of:
            said drive to provide weight to said workstation engagement member to rest on a surface of said first workstation to stabilize using gravity said platform member, said workstation engagement member comprising at least three legs for resting on a surface of said workstation; and
            control a locking mechanism associated with said workstation engagement member to connect to said first workstation to stabilize said platform member;
        said robotic arm to perform a series of movements with respect to said first workstation and said end effector to perform at least one operation at said first workstation with said platform member immobilized using said workstation engagement member;
        said drive to position said platform member to a second workstation;
        for stabilizing said platform member, one of:
            said drive to provide weight to said workstation engagement member to rest on a surface of said second workstation to stabilize using gravity said platform member, said workstation engagement member comprising at least three legs; and
            control a locking mechanism associated with said workstation engagement member to connect to said second workstation to stabilize said platform member;
        said robotic arm to perform a series of movements with respect to said second workstation and said end effector to perform at least one operation at said second workstation with said platform member immobilized using said workstation engagement member.

2. The apparatus as defined in claim 1, wherein said workstation engagement member comprises at least one surface engagement member for ground or table support purposes to provide stability to said platform member using a ground or table support.

3. The apparatus as defined in claim 2, further comprising at least one mounting socket for receiving a lower end of at least one said surface engagement member.

4. The apparatus as defined in claim 3, wherein said mounting socket comprises a lock engaging said lower end.

5. The apparatus as defined in claim 2, wherein said platform member comprises a lower platform member connected to said at least one surface engagement member and an upper platform member connected to said cables, further comprising a release mechanism interconnecting said lower platform member to said upper platform member.

6. The apparatus as defined in claim 5, wherein said lower platform member provides a housing for motor controller and robot arm control computer components for use with a robot arm attachable to said platform member.

7. The apparatus as defined in claim 6, wherein said at least one surface engagement member comprises a power connection for said motor controller and robot arm control computer components for receiving power from said ground or table support.

* * * * *